(12) United States Patent
Tremaine

(10) Patent No.: US 7,574,079 B1
(45) Date of Patent: Aug. 11, 2009

(54) EXOGENOUS TONE DITHER REJECTION IN OPTICAL SWITCHING

(76) Inventor: Brian P. Tremaine, 3633 Westview Dr., San Jose, CA (US) 95148

( * ) Notice: Subject to any disclaimer, the term of this patent is extended or adjusted under 35 U.S.C. 154(b) by 122 days.

(21) Appl. No.: 11/868,415

(22) Filed: Oct. 5, 2007

(51) Int. Cl.
*G02B 6/26* (2006.01)
*G02B 6/42* (2006.01)

(52) U.S. Cl. .......................................... 385/18; 385/16
(58) Field of Classification Search ....................... None
See application file for complete search history.

(56) References Cited

U.S. PATENT DOCUMENTS

| | | | | |
|---|---|---|---|---|
| 3,731,103 | A * | 5/1973 | O'Meara .................. | 250/203.2 |
| 6,549,699 | B2 | 4/2003 | Belser et al. .................... | 385/24 |
| 6,625,346 | B2 | 9/2003 | Wilde ........................... | 385/24 |
| 6,661,948 | B2 | 12/2003 | Wilde ........................... | 385/24 |
| 6,687,431 | B2 | 2/2004 | Chen et al. ..................... | 385/24 |
| 6,695,457 | B2 | 2/2004 | Van Drieenhuizen et al. ........................... | 359/872 |
| 6,760,511 | B2 | 7/2004 | Garrett et al. .................. | 385/24 |
| 6,820,988 | B2 | 11/2004 | Van Drieenhuizen et al. ........................... | 359/872 |
| 7,324,760 | B2 * | 1/2008 | Gronbach et al. ........... | 398/183 |

* cited by examiner

*Primary Examiner*—Michelle R. Connelly-Cushwa
*Assistant Examiner*—Chris Chu
(74) *Attorney, Agent, or Firm*—Joshua D. Isenberg; JDI Patent

(57) ABSTRACT

Methods and apparatus for dither control of a micromirror using a servo control loop in an optical switching apparatus, an optical switching apparatus and optical network are disclosed. A servo control loop may use dither tone having two or more frequency components to dither an output driver that controls the position of a micromirror in an optical switch. The two components may be demodulated from an optical signal deflected by the micromirror. The optical signal may be fed into two band-pass filters. Each band-pass filter may have a pass band centered on a different one of the two frequency components. The envelope detector may compare the envelopes of the band-pass filter outputs. If the envelopes differ by more than a set threshold the output of the envelope detector may be forced to zero. Otherwise, the output of the envelope detector may be the sum of the two band-pass filter outputs.

25 Claims, 12 Drawing Sheets

EXOGENOUS TONE DITHER REJECTION IN OPTICAL SWITCHING

FIELD OF THE INVENTION

This invention generally relates to optical communications systems and methods for wavelength division multiplexed (WDM) optical networks, and more particularly dither tone rejection in modulation of micromirrors used in wavelength selective switch (WSS) systems.

BACKGROUND OF THE INVENTION

Multi-channel optical signals typically comprise a plurality of spectral channels, each having a distinct center wavelength and an associated bandwidth. The center wavelengths of adjacent channels are spaced at a predetermined wavelength or frequency interval, and the plurality of spectral channels may be wavelength division multiplexed to form a composite multi-channel signal of the optical network. Each spectral channel is capable of carrying separate and independent information. At various locations, or nodes, in the optical network, one or more spectral channels may be dropped from or added to the composite multi-channel optical signal, as by using, for example, a reconfigurable optical add-drop multiplexer (ROADM).

Reconfigurable optical add-drop architectures utilize a wavelength-separating-routing (WSR) apparatus and methods employing an array of fiber collimators providing an input (output) port and a plurality of output (input) ports; a wavelength-separator; a beam-focuser; and an array of channel micromirrors. Reconfigurable optical add-drop architectures are disclosed in commonly assigned U.S. Pat. Nos. 6,549,699, 6,625,346, 6,661,948, 6,687,431, and 6,760,511, the disclosures of which are incorporated by reference herein.

In operation, a multi-wavelength optical signal emerges from the input port. The wavelength-separator separates the multi-wavelength optical signal into multiple spectral channels; each characterized by a distinct center wavelength and associated bandwidth. The beam-focuser focuses the spectral channels into corresponding spectral spots. The channel micromirrors may be microelectromechanical system (MEMS) mirrors that are positioned such that each channel micromirror receives one of the spectral channels. MEMS generally refers to any of a number of mico-scale electromechanical devices that are typically fabricated using material deposition and etching techniques similar to those used in semiconductor integrated circuit manufacture. The channel micromirrors are individually controllable and movable, e.g., continuously pivotable (or rotatable), so as to reflect the spectral channels into selected output ports. As such, each channel micromirror is assigned to a specific spectral channel, hence the name "channel micromirror". And each output port may receive any number of the reflected spectral channels. A distinct feature of the channel micromirrors in this architecture, in contrast to those used previously, is that the motion, e.g., pivoting (or rotation), of each channel micromirror is under analog control such that its pivoting angle can be continuously adjusted. This enables each channel micromirror to scan its corresponding spectral channel across all possible output ports and thereby direct the spectral channel to any desired output port.

The above-mentioned U.S. patents also refer to a means for achieving optimal coupling by using a dither scheme. Dithering a MEMS mirror is a means of determining the peak coupling of an optical communication path. The amount of dither used is a tradeoff between adding an unwanted disturbance to the optical path and having sufficient dither signal for servo control. Unfortunately, the process involved in building a MEMS device results in parameter variations from mirror to mirror. It would be advantageous to tune each MEMS mirror to avoid the process variation.

The Port and Channel servos on certain WSS systems, such as the WP4500 from Capella Photonics, Inc., of San Jose, Calif., use a dither tone to determine the direction and amount the servos will move the micromirror. The dither tone frequency is typically a sinusoid. The dither tone and a copy of the dither tone that is 90-degrees out of phase with the dither tone are used to dither a micromirror about two orthogonal axes. The resulting optical signal detected by the OCM is demodulated into sine and cosine components that are synchronously demodulated to form the control signals for the MEMS driver.

A disadvantage of the simple sinusoidal dither tone is that exogenous signals such as mechanical vibration or network optical modulation may be interpreted by the control system as a valid dither tone. In this case the mirrors can missposition in response to the exogenous tone. It is the object of this invention to describe a method which is not susceptible to exogenous or alien, tones.

It is within this context that embodiments of the present invention arise.

BRIEF DESCRIPTION OF THE DRAWINGS

Other objects and advantages of the invention will become apparent upon reading the following detailed description and upon reference to the accompanying drawings in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the embodiments of the invention described below are set forth without any loss of generality to, and without imposing limitations upon, the claimed invention.

Embodiments of the present invention make use of a servo control loop that may use a dither tone having two or more frequency components to dither servos that control the position of a micromirror in an optical switch. The optical signal may be fed into two band-pass filters. Each band-pass filter may have a pass band centered on a different one of the two frequency components. An envelope detector may be applied to the output of each band-pass filter. The envelope detector may compare the band-pass filter outputs. A real-time check may be made of the values of the envelopes of the band-pass filter outputs. If the envelopes differ by more than a set threshold, the output of the envelope detector is forced to zero. Otherwise, the output of the envelope detector may be the sum of the two band-pass filter outputs. Such a configuration may prevent the servos from responding to exogenous or alien tones that fall within one pass-band or the other.

Figure 1A:
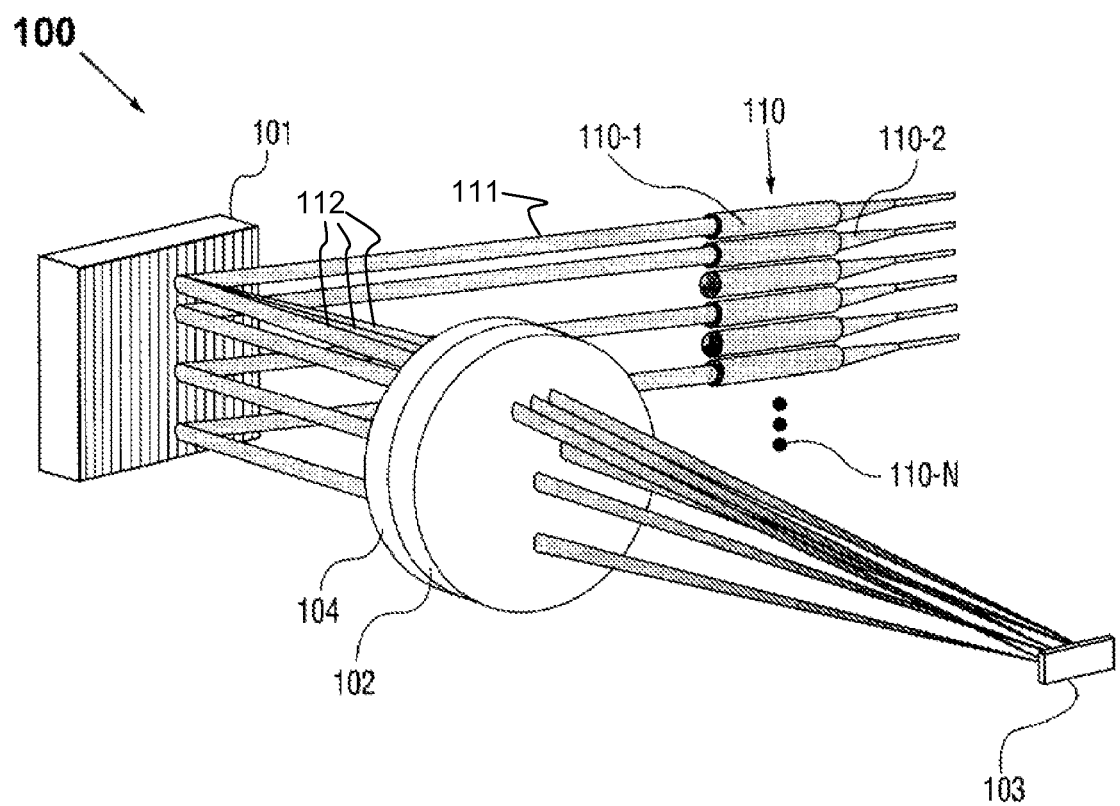
FIG. 1A depicts a wavelength-separating-routing (WSR) apparatus of a type that may be used with embodiments of the present invention.

FIG. 1A depicts a wavelength-separating-routing (WSR) apparatus 100 of a type that may be used in conjunction with embodiments of the present invention. By way of example to illustrate the general principles and the topological structure of a wavelength-separating-routing (WSR) apparatus of the present invention, the WSR apparatus 100 comprises multiple input/output ports which may be in the form of an array of fiber collimators 110, providing an input port 110-1 and a plurality of output ports 110-2 through 110-N (N≧3); a wavelength-separator which in one form may be a diffraction grating 101; a beam-focuser in the form of a focusing lens 102; and an array of channel micromirrors 103.

In operation, a multi-wavelength optical signal emerges from the input port 110-1. The diffraction grating 101 angularly separates the multi-wavelength optical signal into multiple spectral channels, which are in turn focused by the focusing lens 102 into a spatial array of corresponding focused spots (not shown in FIG. 1A). The channel micromirrors 103 are positioned in accordance with the spatial array formed by the spectral channels, such that each channel micromirror receives one of the spectral channels. The channel micromirrors 103 are individually controllable and movable, e.g., pivotable (or rotatable) under analog (or continuous) control, such that, upon reflection, the spectral channels are directed into selected ones of the output ports 110-2 through 110-N by way of the focusing lens 102 and the diffraction grating 101. As such, each channel micromirror in the array 103 is assigned to a specific spectral channel, hence the name "channel micromirror". Each output port may receive any number of the reflected spectral channels. By way of example, the channel micromirrors 103 may be electrostatically actuated micro-electromechanical systems (MEMS) mirrors. Examples of suitable MEMS mirrors are described in detail, e.g., in U.S. Pat. Nos. 6,695,457 and 6,820,988, the entire disclosures of which are incorporated herein by reference. Embodiments of the present invention are not limited to electrostatic MEMS mirrors but can also apply to MEMS mirrors with other forms of actuation such as voice-coil motor or magnetostatic actuation.

For purposes of illustration and clarity, only a select few (e.g., three) of the spectral channels, along with the input multi-wavelength optical signal, are graphically illustrated in FIG. 1A and the following figures. It should be noted, however, that there can be any number of the spectral channels in a WSR apparatus of the present invention (so long as the number of spectral channels does not exceed the number of channel mirrors employed in the system). It should also be noted that the optical beams representing the spectral channels shown in FIG. 1A and the following figures are provided for illustrative purpose only. That is, their sizes and shapes may not be drawn according to scale. For instance, the input beam and the corresponding diffracted beams generally have different cross-sectional shapes, so long as the angle of incidence upon the diffraction grating is not equal to the angle of diffraction, as is known to those skilled in the art.

In the embodiment of FIG. 1A, it is preferable that the diffraction grating 101 and the channel micromirrors 103 are placed respectively in the first and second (i.e., the front and back) focal planes (on the opposing sides) of the focusing lens 102. Such a telecentric arrangement allows the chief rays of the focused beams to be parallel to each other and generally parallel to the optical axis. In this application, the telecentric configuration further allows the reflected spectral channels to be efficiently coupled into the respective output ports, thereby minimizing various translational walk-off effects that may otherwise arise. Moreover, the multi-wavelength input optical signal is preferably collimated and circular in cross-section. The corresponding spectral channels diffracted from the diffraction grating 101 are generally elliptical in cross-section; they may be of the same size as the input beam in one dimension and elongated in the other dimension.

It is known that the diffraction efficiency of a diffraction grating is generally polarization-dependent. For instance, the diffraction efficiency of a grating in a standard mounting configuration may be considerably higher for p (or TM) polarization (perpendicular to the groove lines on the grating) than for s (or TE) polarization (orthogonal to p-polarization), or vice versa. To mitigate such polarization-sensitive effects, a quarter-wave plate 104 may be optically interposed between the diffraction grating 101 and the channel micromirrors 103, and preferably placed between the diffraction grating 101 and the focusing lens 102 as is shown in FIG. 1A. In this way, each spectral channel experiences a total of approximately 90-degree rotation in polarization upon traversing the quarter-wave plate 104 twice. (That is, if an optical beam has p-polarization when first encountering the diffraction grating, it would have predominantly (if not all) s-polarization upon the second encountering, and vice versa.) This ensures that all the spectral channels incur nearly the same amount of round-trip polarization dependent loss In the WSR apparatus 100 of FIG. 1A, the diffraction grating 101, by way of example, is oriented such that the focused spots of the spectral channels fall onto the channel micromirrors 103 in a horizontal array, as illustrated in FIG. 1B.

Figure 1B:
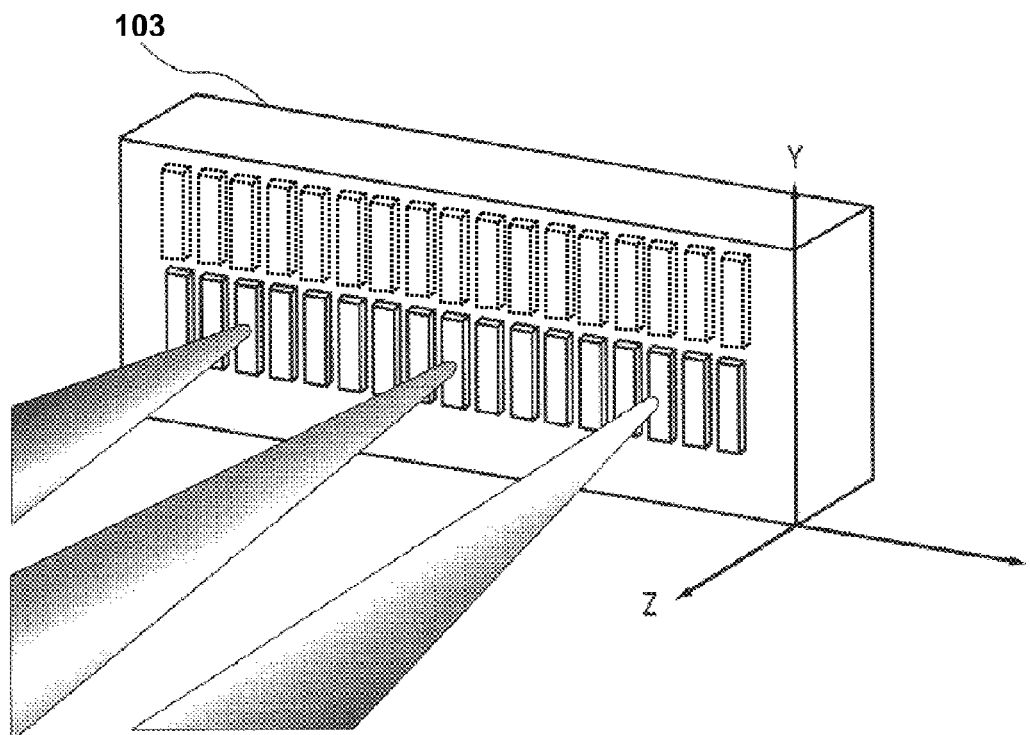
FIG. 1B is a close-up view of the array of channel micromirrors shown in the apparatus of FIG. 1A.
Figure 1C:
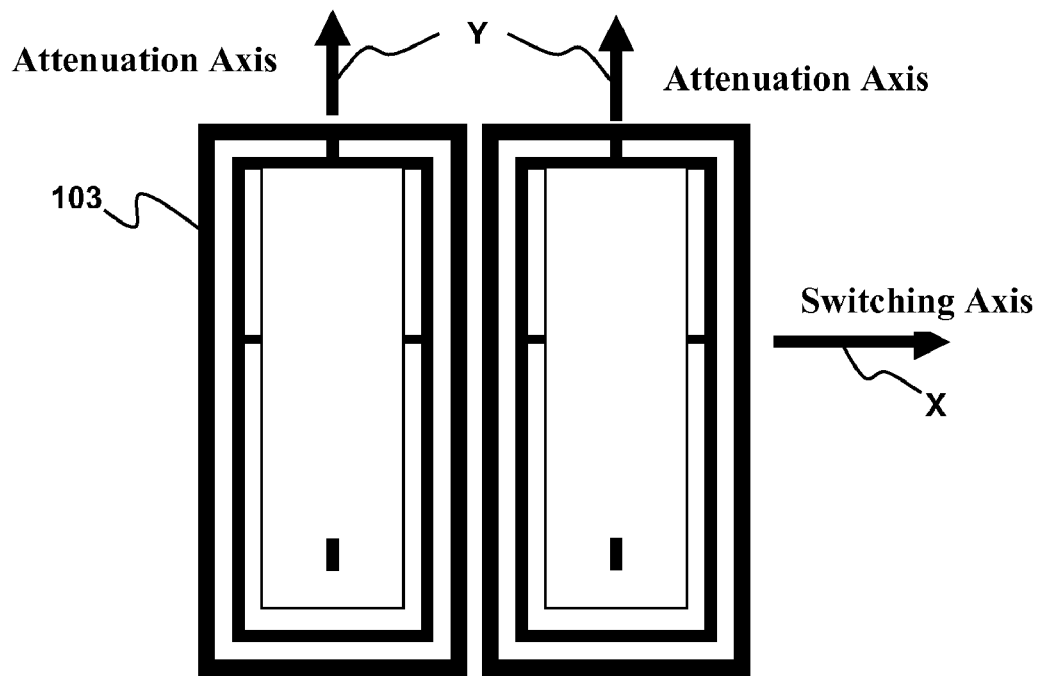
FIG. 1C is a schematic diagram of a bi-axial mirror array for use with the apparatus of FIG. 1A.

Depicted in FIG. 1B is a close-up view of the array of channel micromirrors 103 shown in the apparatus of FIG. 1A. By way of example, the channel micromirrors 103 may be arranged in a one-dimensional array along the x-axis (i.e., the horizontal direction in the figure), so as to receive the focused spots of the spatially separated spectral channels in a one-to-one correspondence. (As in the case of FIG. 1A, only three spectral channels are illustrated, each represented by a converging beam.) In alternative embodiments, the array of channel micromirrors 103 may be a two-dimensional array, e.g., with a second one-dimensional array proximate to the first as indicated in phantom in FIG. 1B. The reflective surface of each channel micromirror lies in an x-y plane as defined in the figure and is movable, e.g., pivotable (-or rotatable) about an axis along the x-direction in an analog (or continuous) manner. Each spectral channel, upon reflection, is deflected in the y-direction (e.g., downward) relative to its incident direction, so as to be directed into one of the output ports 110-2 through 110-N shown in FIG. 1A. As depicted in FIG. 1C, each channel micromirror 103 may be a biaxial micromirror configured to rotate about a switching axis X and an attenuation axis Y. Although a one-dimensional array of channel micromirrors 103 is depicted and described herein, those of skill in the art will recognize that embodiments of the invention may be readily applied to two-dimensional micromirror arrays as well.

Figure 1D:
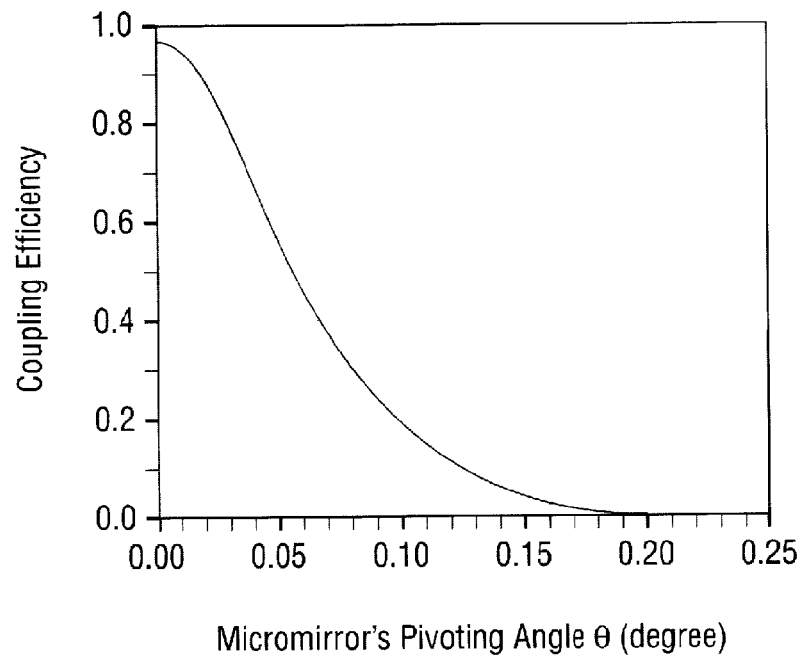
FIG. 1D is a plot of coupling efficiency as a function of a channel micromirror's pivoting angle $\theta$.

As described above, the motion of each channel micromirror is individually and continuously controllable, such that its position, e.g., pivoting angle, can be continuously adjusted. This enables each channel micromirror to scan its corresponding spectral channel across all possible output ports and thereby direct the spectral channel to any desired output port. To illustrate this capability, FIG. 1D shows a plot of coupling efficiency as a function of a channel micromirror's pivoting angle $\theta$, provided by a ray-tracing model of a WSR apparatus in the embodiment of FIG. 1A. As used herein, the coupling efficiency for a spectral channel is defined as the ratio of the amount of optical power coupled into the fiber core in an output port to the total amount of optical power incident upon the entrance surface of the fiber (associated with the fiber collimator serving as the output port). In the ray-tracing model, the input optical signal is incident upon a diffraction grating with 700 lines per millimeter at a grazing angle of 85 degrees, where the grating is blazed to optimize the diffraction efficiency for the "−1" order. The focusing lens has a focal length of 100 mm. Each output port may be provided by a quarter-pitch GRIN lens (2 mm in diameter) coupled to an optical fiber. As displayed in FIG. 1D, the coupling efficiency varies with the pivoting angle $\theta$, and it requires about a 0.2-degree change in $\theta$ for the coupling efficiency to become practically negligible in this exemplary case. As such, each spectral channel may practically acquire any coupling efficiency value by way of controlling the pivoting angle of its corresponding channel micromirror. This is also to say that variable optical attenuation at the granularity of a single wavelength can be obtained in a WSR apparatus of the present invention.

Figure 2:
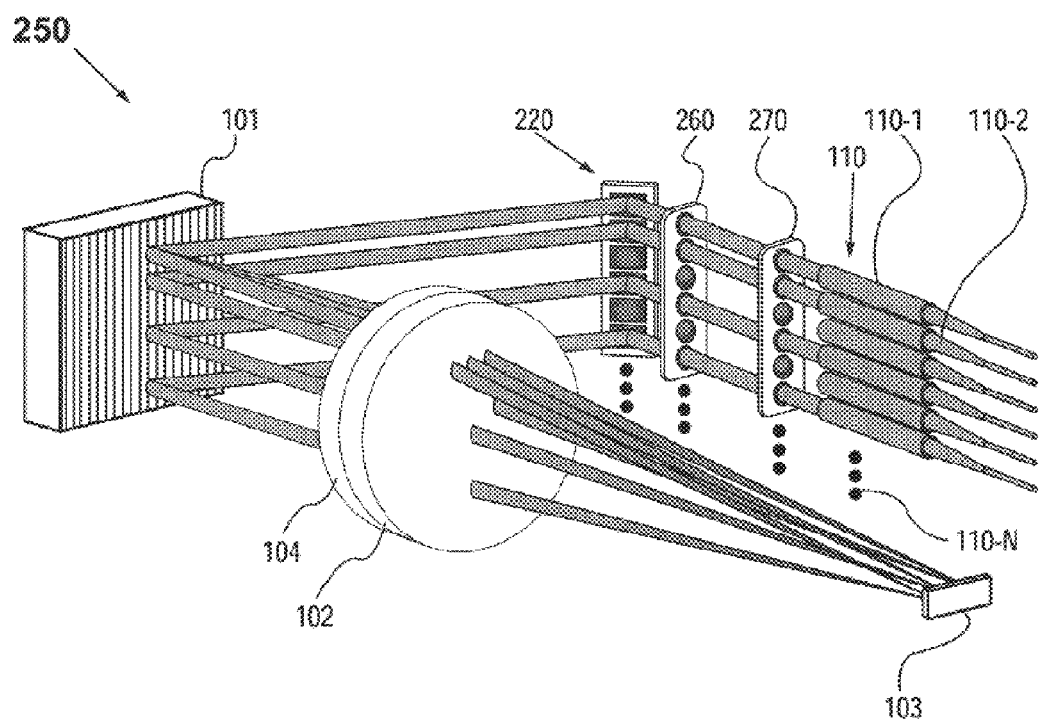
FIG. 2 is a schematic diagram of an alternative WSR apparatus of a type that may be used with embodiments of the present invention.

FIG. 2 depicts an alternative WSR apparatus 250 that may be used with embodiments of the present invention. By way of example, WSR apparatus 250 is built upon and hence shares a number of the elements described above with respect to FIG. 1A, as identified by those labeled with identical numerals. In addition to the components describe above, the WSR apparatus 200 further includes a one-dimensional array 220 of collimator-alignment mirrors (sometimes referred to as port mirrors) 220-1 through 220-N optically interposed between the diffraction grating 101 and the fiber collimator array 110. The collimator-alignment mirror 220-1 is designated to correspond with the input port 110-1, for adjusting the alignment of the input multi-wavelength optical signal and therefore ensuring that the spectral channels impinge onto the corresponding channel micromirrors. The collimator-alignment mirrors 220-2 through 220-N are designated to the output ports 110-2 through 110-N in a one-to-one correspondence, serving to provide angular control of the collimated beams of the reflected spectral channels and thereby facilitating the coupling of the spectral channels into the respective output ports according to desired coupling efficiencies. Each collimator-alignment mirror may be rotatable about one axis, or two axes. Settings for the orientation of each of the collimator alignment mirrors 220-1 to 220-N may be established from a set of stored values with each mirror set to a single position for optimum coupling to its corresponding port.

The apparatus 250 may also include first and second two-dimensional arrays 260, 270 of imagining lenses, which are placed in a 4-f telecentric arrangement with respect to the two-dimensional collimator-alignment mirror array 220 and the fiber collimator array 220. By way of example, the imaging lenses in the first and second arrays 260, 270 may all have the same focal length f. The collimator-alignment mirrors in the array 220 are placed at the respective first (or front) focal points of the imaging lenses in the first array 260. Likewise, the fiber collimators in the fiber collimator array 110 are placed at the respective second (or back) focal points of the imaging lenses in the second array 270. The separation between the first and second arrays 260, 270 of imaging lenses is 2f. In this way, the collimator-alignment mirrors are effectively imaged onto the respective entrance surfaces (i.e., the front focal planes) of the GRIN lenses in the corresponding fiber collimators. Such a telecentric imaging system substantially eliminates translational walk-off of the collimated beams at the output ports that may otherwise occur as the mirror angles change.

Figure 3:
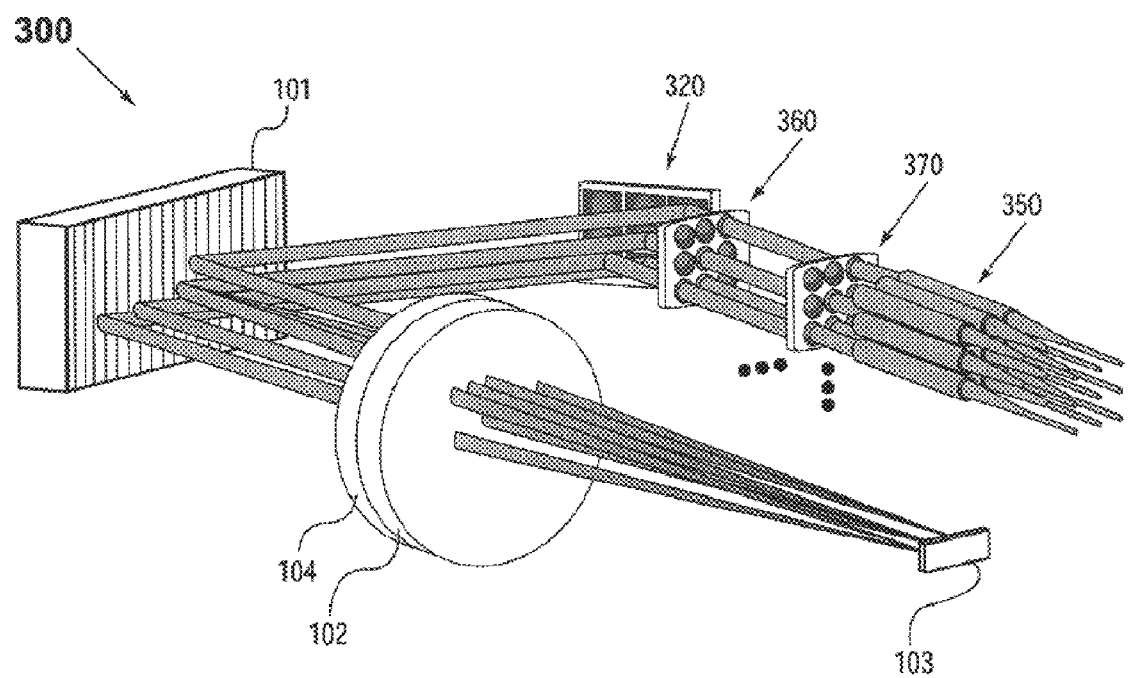
FIG. 3 is a schematic diagram of another alternative WSR apparatus of a type that may be used with embodiments of the present invention.

FIG. 3 shows another alternative WSR apparatus 300 that can be used with embodiments of the present invention. By way of example, WSR apparatus 300 is built upon and hence shares a number of the elements used in the apparatus of FIG. 1A and FIG. 2, as identified by those labeled with identical numerals. In this case, the one-dimensional fiber collimator array 110 of FIG. 2 is replaced by a two-dimensional array 350 of fiber collimators, providing for an input-port and a plurality of output ports. Accordingly, the one-dimensional collimator-alignment mirror array 220 of FIG. 2 is replaced by a two-dimensional array 320 of collimator-alignment mirrors, and first and second one-dimensional arrays 260, 270 of imaging lenses of FIG. 2 are likewise replaced by first and second two-dimensional arrays 360, 370 of imagining lenses respectively. As in the case of the embodiment of FIG. 3, the first and second two-dimensional arrays 360, 370 of imaging lenses are placed in a 4-f telecentric arrangement with respect to the two-dimensional collimator-alignment mirror array 320 and the two-dimensional fiber collimator array 350. The channel micromirrors 103 must be pivotable biaxially in this case (in order to direct its corresponding spectral channel to any one of the output ports). As such, the WSR apparatus 300 is equipped to support a greater number of the output ports.

In embodiments of the present invention, the channel micromirrors 103 are controlled by servo-control loops that are integrated into optical switches, e.g., of the types described above with respect to FIG. 1A, FIG. 2 and FIG. 3.

Figure 4:
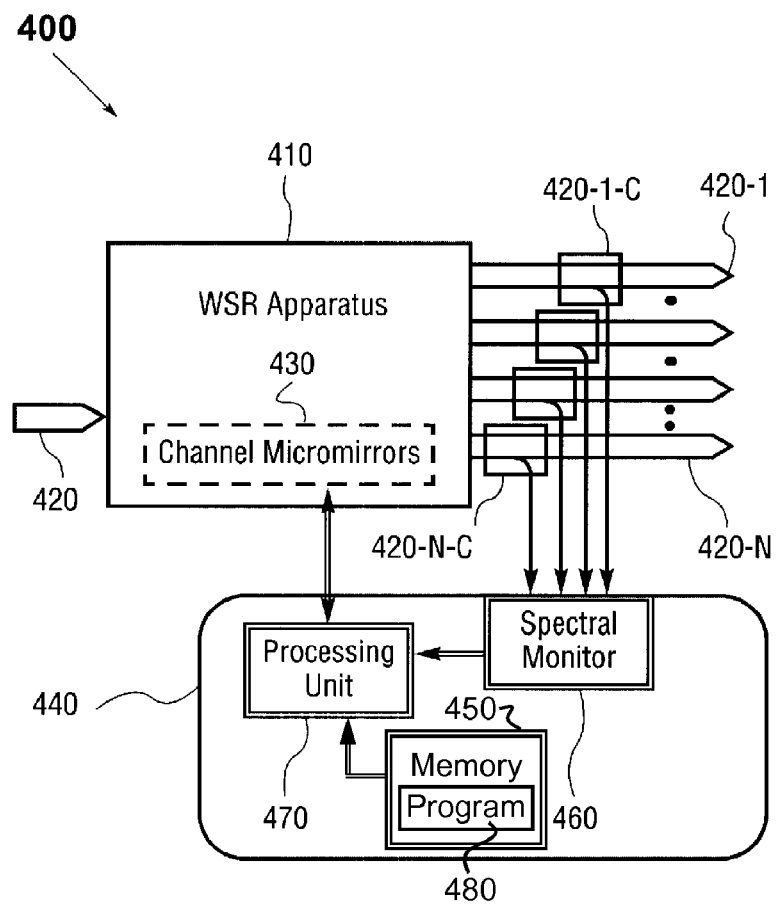
FIG. 4 is a schematic diagram of a WSR apparatus having a servo-control according to an embodiment of the present invention.

FIG. 4 depicts a schematic illustration of a WSR-S apparatus according to an embodiment of the present invention. The WSR-S apparatus 400 comprises a WSR apparatus 410 and a servo-control assembly 440. The WSR apparatus 410 may be substantially similar to the WSR apparatus 100 of FIG. 1A, the WSR apparatus 250 of FIG. 2 or the WSR apparatus 300 of FIG. 3 or any other embodiment in accordance with the present invention. The servo-control assembly 440 includes a spectral power monitor 460, for monitoring the optical power levels of the spectral channels coupled into output ports 420-1 through 420-N of the WSR apparatus 410. By way of example, the spectral power monitor 460 may be coupled to the output ports 420-1 through 420-N by way of fiber-optic couplers 420-1-C through 420-N-C, wherein each fiber-optic coupler serves to "tap off" a predetermined fraction of the optical signal in the corresponding output port. The servo-control assembly 440 further includes a processing unit 470, in communication with the spectral power monitor 460 and the channel micromirrors 430 of the WSR apparatus 410. The servo control assembly 440 may further include a non-volatile memory 450 which may be programmed with instructions in the form of a program 480 that is readable by the processing unit 470. The memory 450 may be a non-volatile memory, such as a read only memory (ROM), an electronically programmable read-only memory (EEPROM), disk drive, flash memory or the like.

The program 480 may implement a method of generating and detecting a dither tone amplitude as described below. The program 480 may be implemented by using digital signal processing (DSP) firmware using a logic chip such as a field programmable gate array (FPGA) as the processor 470 and memory 450. Although the program code 480 is described herein as being implemented in firmware and executed using an FPGA, those skilled in the art will realize that the method of dither generation and detection could alternatively be implemented using hardware such as an application specific integrated circuit (ASIC) or other hardware circuitry. Alternatively, the program 480 may conform to any one of a number of different programming languages such as Assembly, C++, JAVA or a number of other languages. The processing unit 470 and memory 450 may be part of a general-purpose computer that becomes a specific purpose computer when executing programs such as the program 480. As such, it should be understood that embodiments of the invention can be implemented, in whole or in part, in software, hardware or some combination of both. In one embodiment, among others, the program code 480 may include a set of processor readable instructions that implement a method having features in common with the method 700 of FIG. 7 or the method 800 of FIG. 8, both of which are described below.

The processing unit 470 uses the optical power measurements from the spectral power monitor 460 to provide feedback control of the channel micromirrors 430 on an individual basis, so as to maintain a desired coupling efficiency for each spectral channel into a selected output port. As such, the servo-control assembly 440 provides dynamic control of the coupling of the spectral channels into the respective output ports on a channel-by-channel basis and thereby manages the optical power levels of the spectral channels coupled into the output ports. The optical power levels of the spectral channels in the output ports may be dynamically managed according to demand, or maintained at desired values (e.g., equalized at a predetermined value) in the present invention.

By way of example, the processing unit 470 may apply an appropriate alternating (or "dither") control signal (dither tone) to a channel micromirror, in superposition with the dc control signal for maintaining the channel micromirror at a particular pivoting position. The dither tone applied to the channel micromirror may be configured as described below. This enables both the optical power level of the corresponding spectral channel and the rate of change in the optical power level (or the time derivative of the optical power level) at the instant micromirror's pivoting angle to be obtained. In view of the exemplary coupling efficiency curve depicted in FIG. 1D, the rate of change in the optical power level is proportional to the slope of the coupling efficiency curve, and is therefore useful in locating the micromirror's pivoting angle corresponding to the measured optical power level. It is also useful in determining the magnitude of the feedback control signal to be applied to the channel micromirror, so as to achieve the desired coupling efficiency in a most effective manner.

Figure 5:
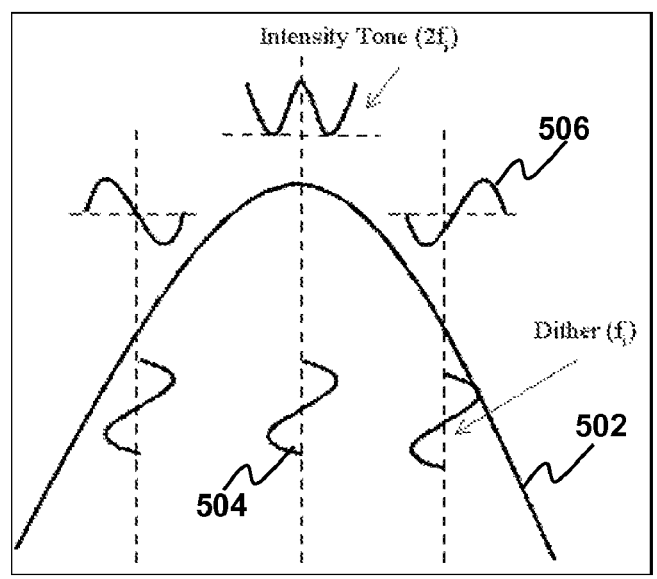
FIG. 5 is a graph of optical coupling versus mirror rotation illustrating the process of dithering.

FIG. 5 illustrates the well-known process of dithering. A curve 502 in the graph represents the optical coupling to a particular collimator for a particular mirror as a function of mirror angle. Vertical squiggles 504 represent dithering of the mirror at a frequency f for different nominal mirror angles. In embodiments of the present invention, the amplitudes of dither signals for coupling each mirror to each different output port may be different. These dither amplitudes are adjusted as described above. The dithering of the mirror produces a corresponding oscillation in an optical coupling signal for the output port. Horizontal squiggles 506 represent the derivative with respect to mirror position of the optical coupling signal (the error signal). At peak coupling the frequency is 2f, while at non-peak coupling the frequency is f with a phase shift of +/−180 degrees. At the peak coupling the average error signal is zero. The error signal is fed into a control loop (e.g., with a PID controller) that controls the mirror. The demodulated dither provides an error signal that can be used in a PID control loop to move the MEMS to optimal coupling. The PID controller adjusts the mirror angle in a way that optimizes the error signal for optimal optical coupling to the collimator.

The servo control assembly 440 typically includes one or more digital-to-analog converters (DACS) that convert digital information from the processing unit to open loop voltages that are applied to the channel micromirrors. The digital information corresponding to the applied voltages are referred to as DAC values. In embodiments of the present invention, the dither tone applied to each micromirror may be determined from stored DAC settings. These DAC settings may establish a dither tone that enhances rejection of alien tones in the control loop.

Figure 6A:
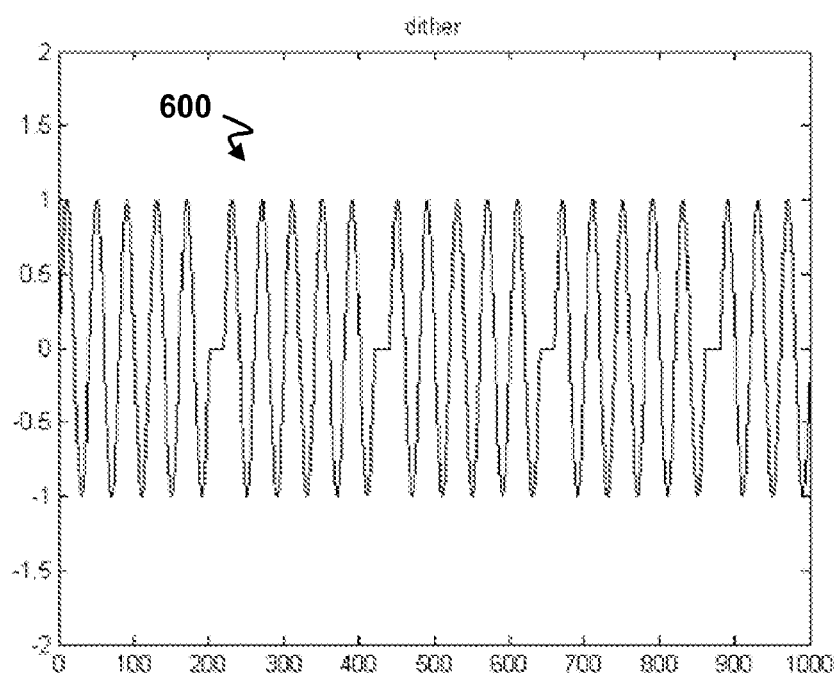
FIG. 6A is a plot of dither amplitude versus time illustrating a dither signature utilized in embodiments of the present invention.

Specifically, the DAC settings may be configured to produce a dither tone 600 as shown in FIG. 6A. The dither tone 600 includes a number M of cycles of a sinusoidal signal of base frequency $f_o$, followed by an odd number of half-cycles during which the amplitude of the dither tone has a constant, e.g., zero value. The odd number of half cycles at constant value are inserted so that the dither tone tends to be out of phase with a continuous sine tone of base frequency $f_o$.

By way of example, the number M of cycles may be greater than 2, e.g., M=5 cycles. By way of example, the dither signals may be cosine and sine waveforms that are generated by using a pointer into a cosine array stored in the memory 450. By way of example, the array may be 512 entries in length and may represent one full cycle of a cosine function. A phase increment may be associated with the dither tone. By way of example, the phase increment may be a product of the frequency $f_o$ and a sample period. Phase increments that are greater than or equal to 1 may be wrapped around to phase equal to −1. In some embodiments, different dither tones may be used for the Port mirror servo and Channel micromirror servo. In such a case, two separate phase increment values may be stored in the memory 450.

Figure 6B:
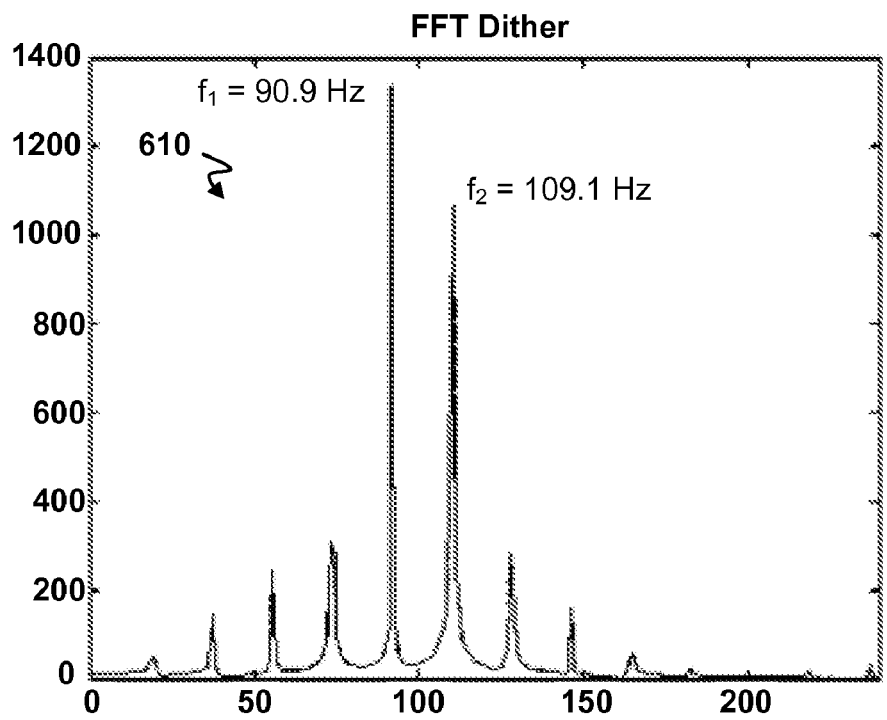
FIG. 6B is a plot of an example of a dither state machine sequence for generating the dither tone used in association with embodiments of the present invention

A Fourier transform of the dither tone 600 reveals a spectrum 610 (referred to herein as a Fourier spectrum) containing two or more frequency components as shown in FIG. 6B. Specifically, the Fourier spectrum 610 includes two principal components including a lower frequency component $f_1$ at a frequency of about 90.9 Hz and an upper frequency component $f_2$ at about 109.1 Hz. It is noted that other frequency components may be present in the Fourier spectrum 610. Although the discussion that follows deals with the two principal components, the concept may be extended to any number of additional frequency components of the Fourier spectrum 610.

Figure 6C:
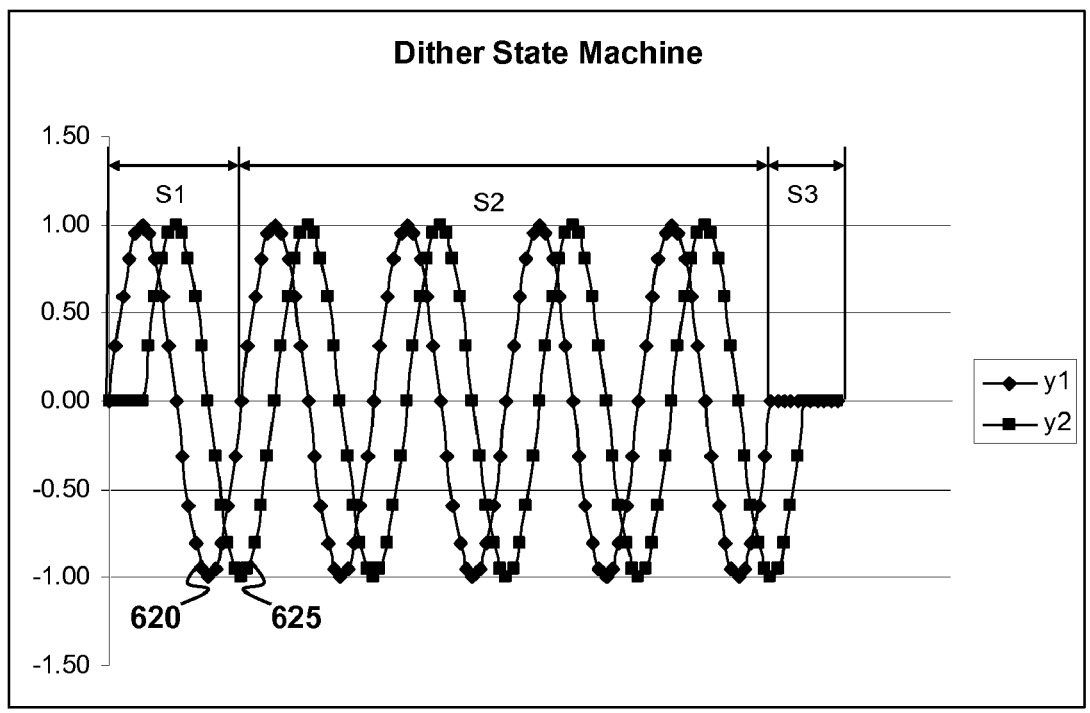
FIG. 6C is a plot of dither amplitude versus frequency for the dither signature depicted in FIGS. 6A-6B.

In some embodiments one servomechanism may be used to adjust a position of a micromirror in two or more directions. For example, for micromirrors 103 of the type shown in FIG. 1A, separate servomechanisms may drive the rotations about the switching axis X and attenuation axis Y. In such cases it may be desirable to dither the mirror position with respect to both axes using similar dither tones having different phases. FIG. 6C depicts an example of separate dither tones y1 620 and y2 625 that may be used to dither a micromirror about two different axes. A full cycle for the first dither tone y1 620 is represented by the time period denoted S1 in FIG. 6C. Four additional full cycles occur within the time period denoted S2 and S3 denotes the half cycle during which the first dither tone y1=0. In this example, each dither tone 620, 625 includes five full cycles of sinusoidal oscillation at a base frequency $f_o$ followed by a half cycle for which the amplitude of oscillation is zero. It is further noted that the second dither tone y2 625 starts a quarter cycle in phase after the first dither tone y1 620. The sequence of five and one-half cycles in this example may be continuously repeated to generate the dither tone.

Figure 6D:
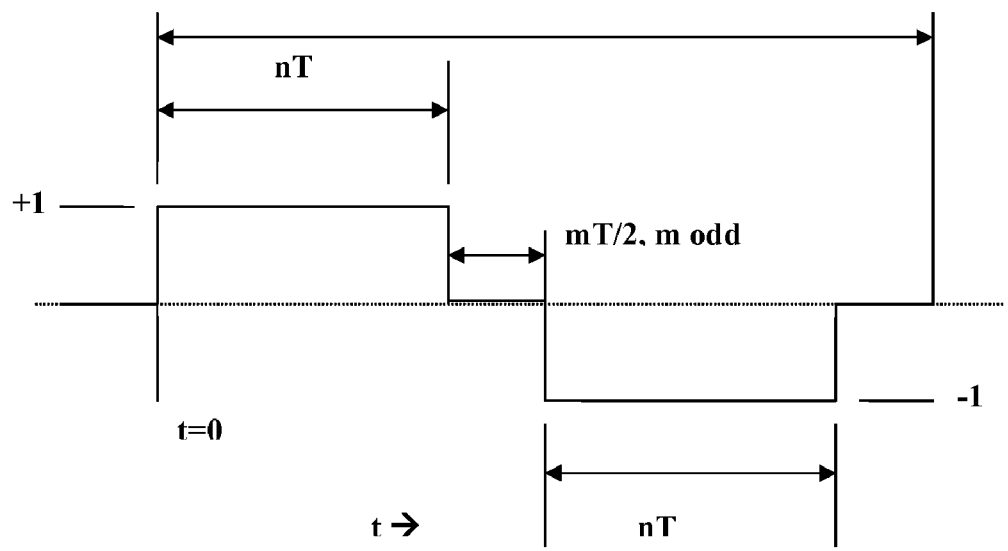
FIG. 6D is a plot of a modulation function that may be used in generating the dither signature of FIG. 6A.
Figure 6E:
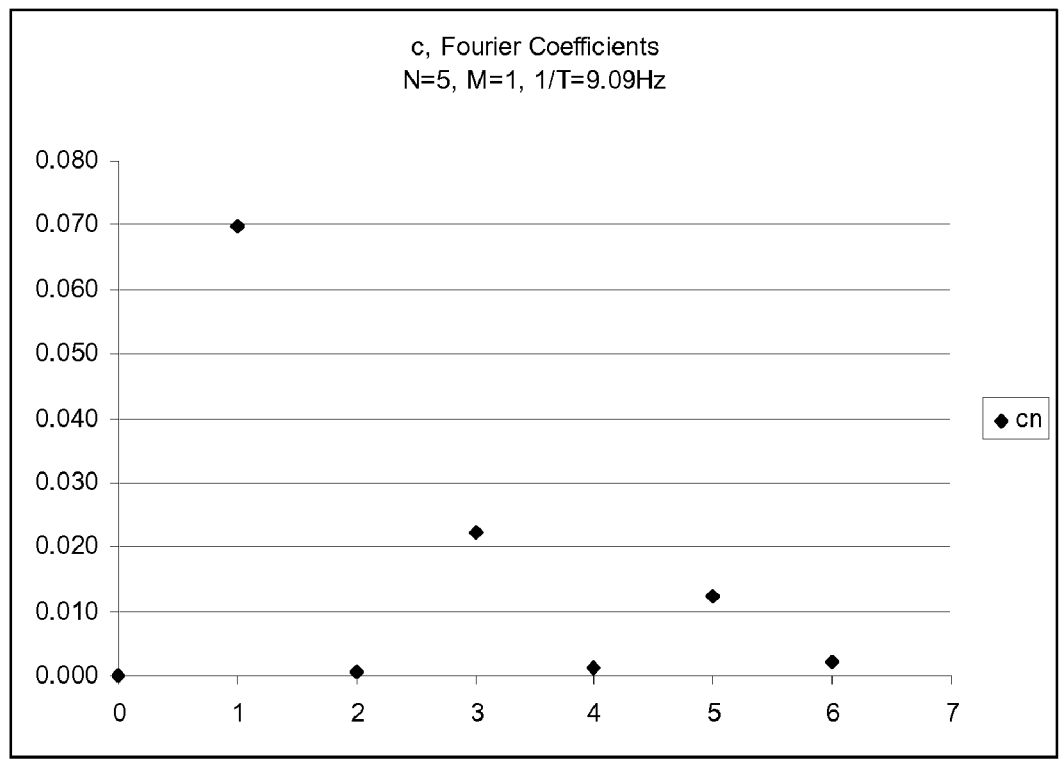
FIG. 6E is a plot of Fourier coefficients as a function of frequency for the modulation function of FIG. 6D.

The dither tone 600 shown in FIG. 6A may be considered as being formed by the multiplication in the time domain of two periodic signals. The first signal is a sinusoid. $s(t) = \sin(2\pi f_o t)$, where $f_o$ is the base frequency and $T = 1/f_o$. The second signal, a modulation waveform $f(t)$, is depicted in FIG. 6D. In this figure, the modulation waveform $f(t)$ has a constant value of +1 for a time interval of duration nT, where 'n' is a positive integer, followed by a time interval of duration mT/2 during which $f(t)$ has a zero value (corresponding to m half cycles) where 'm' is an odd positive integer, followed by an interval of duration nT during which $f(t)$ has a value of +1. The dither signal is $y(t) = s(t) \times f(t)$ in the time domain. In the frequency domain this is $Y(s) = S(s) * F(s)$, here the '*' denotes convolution in the frequency domain. Since $s(t)$ is a continuous sinusoid the Fourier Modulation theorem may be used to write the dither tone frequency components as $Y(j\omega) = \frac{1}{2}F(j\omega) + j\omega 0) + \frac{1}{2}F(j\omega - j\omega 0)$, where $f(t)$ is recognized as a modulation signal. Therefore the frequency components of $y(t)$ are $F(j\omega)$ translated to the side-bands of $S(j\omega)$. The FFT coefficients of $f(t)$ are found to be the odd harmonics of $1/[(2*n+m)*T]$. For the example of n=5, m=1 and $f_o$=100 Hz the components of F(jw) will be 100+/−9.09 Hz, 100+/−27.29 Hz, and 100+/−45.45 Hz with higher harmonics becoming negligible. These components are plotted as a function of frequency in FIG. 6E.

Figure 6F:
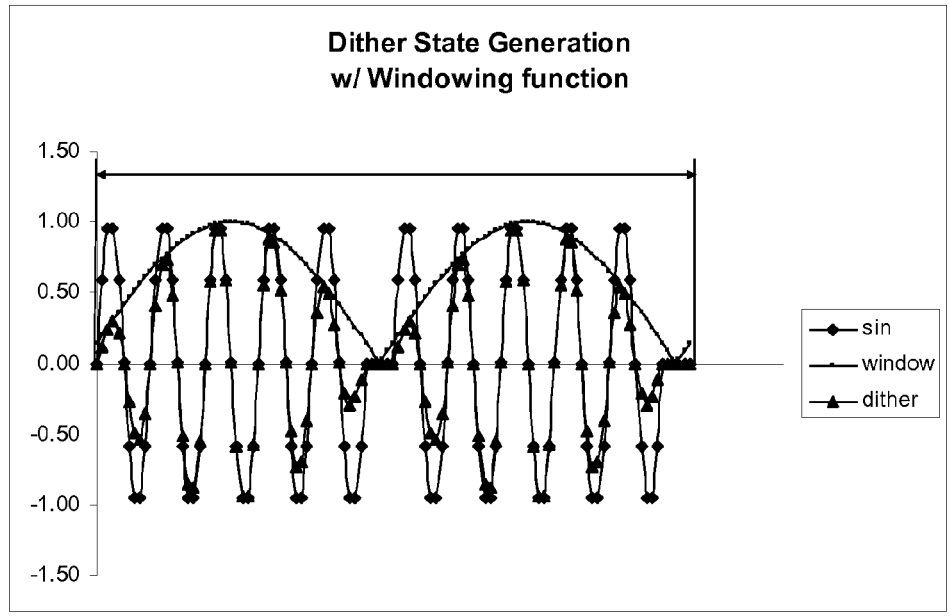
FIG. 6F is a plot illustrating applying a windowing function to the modulation function of FIG. 6D in generating a modified dither tone according to an alternative embodiment of the present invention.

It can also be recognized that the modulation waveform $f(t)$ in FIG. 6D may be multiplied by an FFT windowing function, for example a cosine function, and still be within the scope of embodiments of the present invention. An example of such windowing is illustrated in FIG. 6F. Windowing in this fashion may reduce higher harmonics observed in the Fourier coefficients shown in FIG. 6E.

Figure 7:
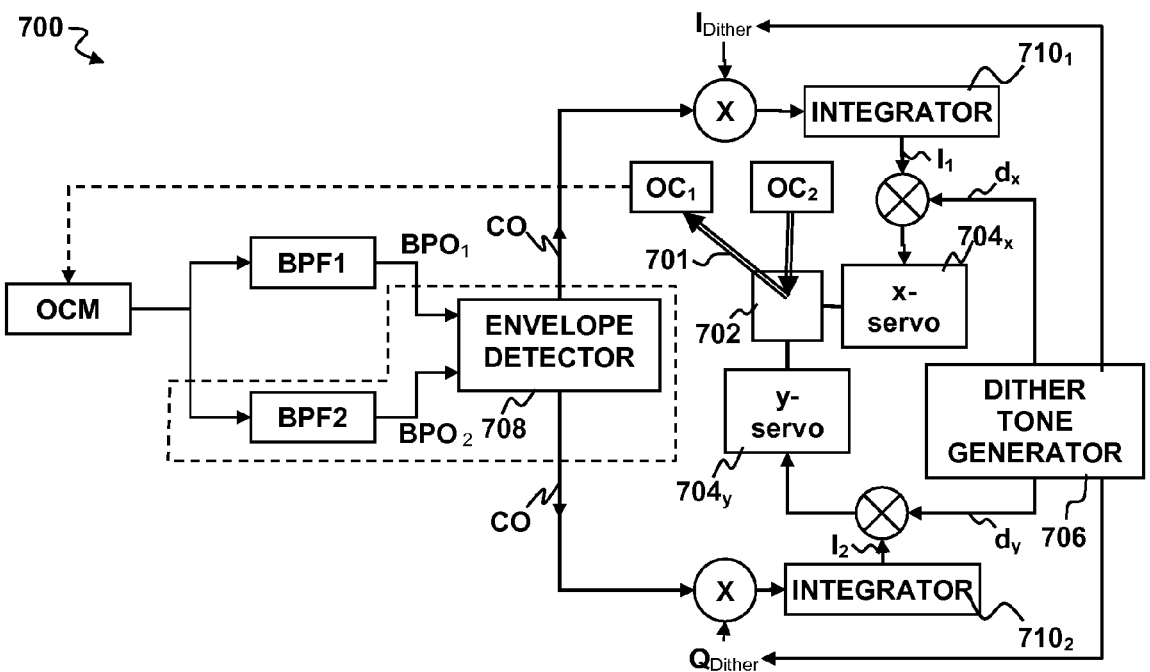
FIG. 7 is a block diagram of an optical switching apparatus according to an embodiment of the present invention.
Figure 8:
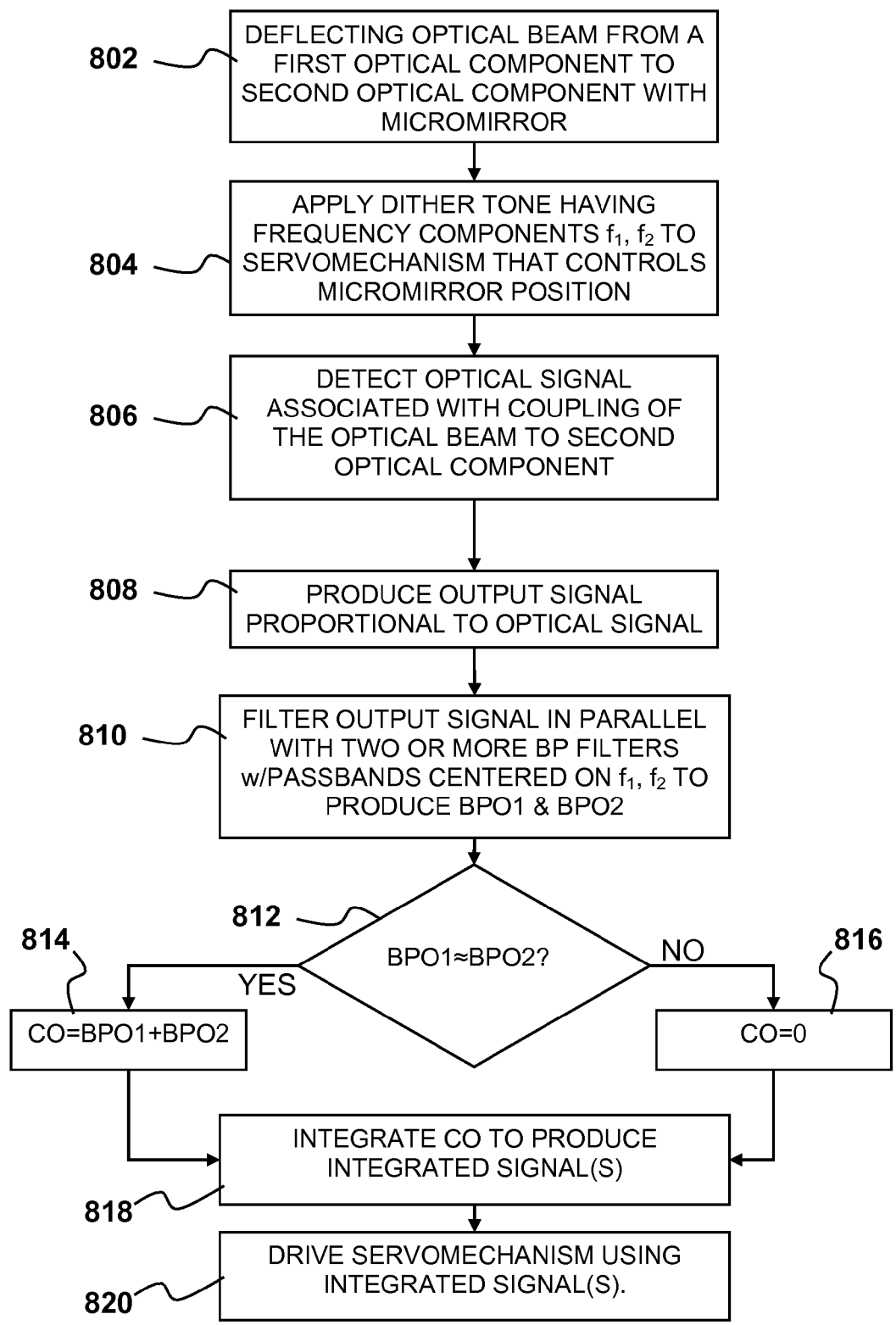
FIG. 8 is a flow diagram illustrating an optical switching method according to an embodiment of the present invention.

Embodiments of the invention may be understood with respect to the block diagram of FIG. 7 and the flow diagram of FIG. 8. As shown in FIG. 7, an optical switching apparatus 700 may comprise first and second optical components $OC_1$, $OC_2$, a micromirror 702 driven by one or more servomechanisms 704$_x$, 704$_y$ coupled to the micromirror 702, an optical signal monitor OCM, a dither tone generator 706, two or more band-pass filters BPF1, BPF2 coupled to the signal monitor OCM and an envelope detector 708 coupled to the band-pass filters BPF1, BPF2. One or more integrators 710$_1$, 710$_2$ are coupled to the envelope detector 708 and the servomechanisms 704$_x$, 704$_y$. Components that are believed to be different from prior servo control systems for micromirrors are surrounded by a dashed line.

The micromirror 702 may be one mirror from among an array of micromirrors in an optical switch as described above with respect to FIG. 1 through FIG. 4. The micromirror 702 may be configured to rotate about two different, e.g., orthogonal axes for switching and attenuation, e.g., as described above with respect to FIG. 1C. Rotation about x and y axes may be facilitated through the use of separate output drivers 704$_x$, 704$_y$ for the x and y axis respectively. By way of example, and without limitation, the micromirror 702 may be a channel micromirror or a port mirror within an optical switch of the type described above with respect to FIG. 2, FIG. 3 and FIG. 4. By way of example, the output drivers 704$_x$, 704$_y$ may each include a digital-to-analog converter and high voltage MEMS driver. The micromirror 702 is disposed along an optical path between the first and second optical components $OC_1$, $OC_2$. By way of example, the optical components may be two different fiber collimators in the fiber collimator array 110 of FIG. 2 or the two-dimensional fiber collimator array 350 of FIG. 3. The micromirror 702 is configured to selectively redirect an optical beam 701 from the first optical component $OC_1$ to the second optical component $OC_2$. The output driver 704 is configured to adjust a position of the micromirror 702 in response to one or more control signals to control the optical coupling of the optical beam 701 to the second optical component $OC_2$. The optical signal monitor OCM is configured to detect an optical signal associated with a degree of optical coupling of the optical beam 701 to the second optical component $OC_2$ and produce an output signal proportional to the optical signal. By way of example, the optical signal monitor OCM may be the spectral power monitor 460 coupled to one or more of the output ports 420-1 through 420-N by way of "tap off" fiber-optic couplers 420-1-C through 420-N-C, as described above with respect to FIG. 4.

The dither tone generator 706 is configured to sum dither tone control signals to the output drivers 704$_x$, 704$_y$. The dither tone control signal includes two or more frequency components, including a first component characterized by a frequency $f_1$ and a second component characterized by a frequency $f_2$. By way of example, the dither tone signal may be configured as shown and described above with respect to FIG. 6A, FIG. 6B and FIG. 6C. Two similar dither tones having different phase may drive the x- and y-output drivers, respectively. Specifically, the dither tone generator 706 may generate a dither signal $d_x$ for driving the x-output driver 704$_x$ having M cycles at a frequency $f_o$ followed by a half-cycle at a constant, e.g., zero value. The dither tone generator 706 may similarly generate a dither tone signal $d_y$ for driving the y-output driver 704$_y$. Like $d_x$, $d_y$ may have M cycles at a frequency $f_o$ followed by a half-cycle at a constant, e.g., zero value. However, $d_y$ is a quarter cycle out of phase with $d_x$.

By way of example, and without loss of generality, the dither tone generator 706 may be implemented by software instructions executed on the processor 470 in FIG. 4. Such instructions may make use of data stored in the memory 450. Alternatively, the dither tone generator may be implemented in hardware e.g., using an application specific integrated circuit (ASIC) or appropriately configured firmware. Alternatively, the function of the dither tone generator 706 may be implemented in some combination of hardware and software.

The band-pass filters include a first band-pass filter BPF1 and a second band-pass filter BPF2. Both band-pass filters are configured to filter the output signal from the optical signal monitor OCM in parallel and respectively produce first and second band-pass outputs $BPO_1$, $BPO_2$. The first band-pass filter BPF1 is characterized by a pass band centered on the frequency $f_1$ of the first component of the dither tone and the second band-pass filter BPF2 is characterized by a pass band centered on the frequency $f_2$ of the second component of the dither tone. Referring again to the example of the dither tone depicted in FIGS. 6A-6B, if the dither tone in FIG. 6A is used, the first band-pass filter BPF1 may have a pass band centered on $f_1=90.9$ Hz and the second band-pass filter BPF2 may have a pass band centered on $f_2=109.1$ Hz.

By way of example, and without loss of generality, the band-pass filters BPF1, BPF2 may be implemented by software instructions executed on the processor 470 in FIG. 4. Such instructions may make use of data stored in the memory 450. Alternatively, band-pass filters BPF1, BPF2 may be implemented in hardware e.g., using an application specific integrated circuit (ASIC) or appropriately configured firmware. Alternatively, the functions of the band-pass filters BPF1, BPF2 may be implemented in some combination of hardware and software.

The band-pass outputs $BPO_1$, $BPO_2$ from the band-pass filters BPF1, BPF2 are coupled to the envelope detector 708. By way of example, and without loss of generality, the envelope detector 708 may be implemented by software instructions executed on the processor 470 in FIG. 4. Such instructions may make use of data stored in the memory 450. Alternatively, envelope detector 708 may be implemented in hardware e.g., using an application specific integrated circuit (ASIC) or appropriately configured firmware. Alternatively, the functions of the envelope detector 708 may be implemented in some combination of hardware and software. The envelope detector 708 is configured to compare the first and second band-pass outputs $BPO_1$, $BPO_2$ to each other and generate a comparison output CO that depends on a degree of agreement between them. By way of example, envelope detector may be configured to produce the comparison output CO as follows:

$CO=BPO_1+BPO_2$, if $BPO_1 \approx BPO_2$;

$CO=0$, otherwise.

As used herein is $BPO_1 \approx BPO_2$ means that $BPO_1$ and $BPO_2$ are approximately equal to each other within a predetermined degree of agreement. By way of example, the degree of agreement may be based on a known Fourier spectrum for the dither tone produced by the dither tone generator 704, e.g., the Fourier spectrum 610 of FIG. 6B.

By way of example, the envelope detector ratio R is calculated as $R=\min(<BPO_1>+\epsilon, <BPO_2>+\epsilon)/\max(<BPO_1>+\epsilon, <BPO_2>+\epsilon)$, where $<BPO>$ denotes the envelope amplitude of BPO, and $\epsilon$ denotes a small positive offset added to the result of the envelope detection. In this formula, the expression min(A, B) returns the minimum of A and B and the expression max(A,B) returns the maximum of A and B. In this example, $BPO_1$ and $BPO_2$ are approximately equal to each other within a predetermined degree of agreement if R is greater than some threshold value. A small, but non-zero, value $\epsilon$ may be added to $<BPO_1>$ and $<BPO_2>$ so that at signals near zero the ratio is 1 and the servos $704_x$, $704_y$ will not be disabled. The value of $\epsilon$ may be chosen equivalent to a 'noise' level' in $BPO_1$ or $BPO_2$ with no external alien tone. By way of example the value of $\epsilon$ may be set to about 0.010.

The threshold value for the ratio R may be set to some nominal value based on the frequency components of the dither tone. The ratio R as calculated ranges from 0 to 1.0. By way of example, in the example dither tone of FIGS. 6A-6C, the nominal measured value of R may range from about 0.7 to about 1.0. Thus it is desirable for the threshold value to be no greater than about 0.7. To allow for noise and not have false positives, certain implementations may use a lower nominal threshold value, e.g., from about 0.5 to about 0.6. If the threshold value is set too low, e.g., less than about 0.4 then the envelope detector 708 may not detect some external tones that it is desirable to reject. In such cases, it is desirable to set the threshold value between about 0.45 and about 0.60.

In some embodiments, when the ratio R exceeds a threshold value, the envelope detector 708 may trigger a retriggerable one-shot (a timer in firmware or hardware) that runs for a fixed period of time, e.g., 1 sec. If the ratio is intermittently tripping the threshold the one-shot stays triggered and the integrators $710_1$, $710_2$ may be held off during this period of time.

In some embodiments, the envelope detector 708 may condition the band-pass filter outputs $BPO_1$, $BPO_2$ prior to performing the comparison operation. By way of example, the envelope detector 708 may implement a rectification followed by a low-pass filter function operating on the band-pass filter outputs $BPO_1$, $BPO_2$ to extract the DC value proportional to average envelope amplitude. Such rectification may be implemented by taking absolute values of the band-pass filter outputs $BPO_1$, $BPO_2$.

The comparison output CO from the envelope detector 708 may be coupled to the integrators $710_1$, $710_2$, which are configured to integrate the comparison output CO to produce one or more integrated signals $I_1$, $I_2$. The integrators $710_1$, $710_2$ couple the integrated signals to a driver input 704, whereby the one or more integrated signals adjust the position of the micromirror 702. By way of example, and without loss of generality, the integrators $710_1$, $710_2$ may be implemented by software instructions executed on the processor 470 in FIG. 4. Such instructions may make use of data stored in the memory 450. Alternatively, integrators $710_1$, $710_2$ may be implemented in hardware e.g., using an application specific integrated circuit (ASIC) or appropriately configured firmware.

If there is interference due to vibration of the components of the apparatus 700 the band-pass filter outputs $BPO_1$, $BPO_2$ will lie outside the range of agreement and the ratio R will not exceed the threshold value. In such a case, the envelope detector 708 would produce a zero comparison output CO. The integrated signals $I_1$, $I_2$ would hold their values until the band-pass filter outputs fell within the range of agreement.

In some embodiments, the detection of an exogenous tone may be used to post a system alarm if the band-pass filter outputs $BPO_1$, $BPO_2$ are not within the predetermined range of agreement. By way of example, an alarm may be posted to the servo control assembly 440 as the alarms occur. A log of such alarms may be stored in the memory 450. Each alarm may list information associated with the alarm including, but not limited to a sequence number, a date, a time of the alarm, a status (e.g., '1' when an alarm has been asserted and '0' when the alarm has been de-asserted), and a count of the number of times a particular alarm was posted.

According to an embodiment of the invention dither control in an optical switching apparatus of the type shown in FIG. 7 may be implemented according to a method 800 as shown in FIG. 8. Specifically the micromirror 702 deflects the optical beam 701, which is deflected from the first optical component $OC_1$ to the second optical component $OC_2$ as indicated at 802. A dither tone is applied to a servomechanism that controls a position of the micromirror 701, as indicated at 804. The dither tone includes two or more frequency components, including a first component $f_1$ and a second component $f_2$. The dithering results in modulation of the optical signal with respect to some nominal value. The optical signal monitor OCM measures an optical signal associated with a degree of coupling of the optical beam 701 to the second optical component $OC_2$ as indicated at 806 and produces an output signal proportional to the optical signal as indicated at 808.

The band-pass filters BPF1, BPF2 filter the output signal from the optical signal monitor OCM in parallel as indicated at 810 to produce first and second band-pass outputs $BPO_1$, $BPO_2$. The first band-pass filter is characterized by a pass band centered on the frequency of the first component $f_1$. Consequently, the first band-pass output $BPO_1$ will mostly be affected by optical modulation at the frequency of the first component $f_1$. Similarly, the second band-pass filter is characterized by a pass band centered on the frequency of the second component $f_2$. Thus, the second band-pass output $BPO_2$ will mostly be affect by optical modulation at the frequency of the second component $f_2$. If no external alien tones are present, the strengths of modulations at the frequencies $f_1$, $f_2$ may be expected to be in the same proportion as the strengths of the corresponding components of the Fourier spectrum of the dither tone. If alien tones are present at either $f_1$ or $f_2$ then these alien tones will tend to drive the band-pass outputs $BPO_1$, $BPO_2$ out of the range of agreement. For example, the alien tones may tend to drive the ratio R below the threshold value.

Therefore, the band-pass outputs $BPO_1$, $BPO_2$ are compared to each other as indicated at 812. A comparison output CO is then generated depending on the result of the comparison. Specifically, the comparison output CO is equal to a sum of the band-pass outputs $BPO_1$ and $BPO_2$ if they are within a predetermined range of agreement, as indicated at 814. The comparison output CO is equal to zero if the band-pass outputs $BPO_1$ and $BPO_2$ are not within the predetermined range of agreement, as indicated at 816.

Figure 9:
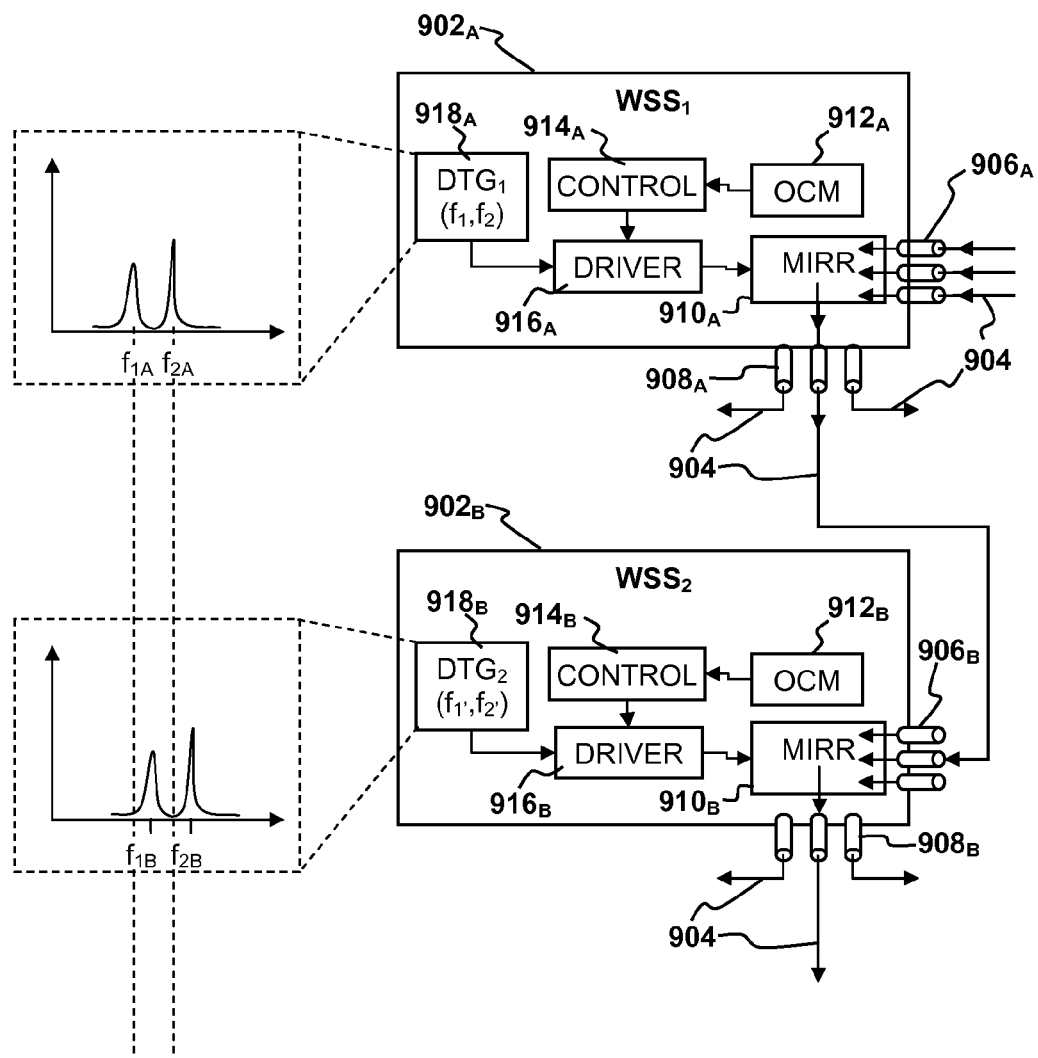
FIG. 9 is a block diagram illustrating an optical network according to an embodiment of the present invention.

The comparison output is then integrated with respect to time to produce one or more integrated signals $I_1$, $I_2$ as indicated at 818. The output drivers $704_x$, $704_y$ are then adjusted using the integrated signals $I_1$, $I_2$ respectively as indicated at 820. By way of example, delays $I_{Dither}$ and $Q_{Dither}$ may be added to the comparison output CO to align the inputs to the integrators $I_1$, $I_2$ in phase with the corresponding dither signals $d_x$, $d_y$ applied to the output drivers $704_x$, $704_y$. In certain embodiments of the invention, the dither tone may be selected from among a plurality of dither tones having upper and lower frequency components fit and $f_i2$. Different dither tones may be used for different optical switches that are cascaded together in an optical network. FIG. 9 depicts an example of an optical network 900 having a plurality of cascaded optical switches $902_A$, $902_B$. The optical switches $902_A$, $902_B$ are coupled to each other by optical fibers 904. Although two switches are shown in FIG. 9 for the sake of example, the network 900 may in principle have any number of similarly configured optical switches. Each switch may receive input optical signals via one or more input ports $906_A$, $906_B$ and may transmit optical signals via one or more output ports $908_A$, $908_B$. In addition one of the output ports on one switch $902_A$ may be connected to an input port on another optical switch $902_B$. Each switch $902_A$, $902_B$ may include one or more micromirrors $910_A$, $910_B$, with corresponding optical signal monitors $912_A$, $912_B$ coupled to controllers $914_A$, $914_B$, which may include band-pass filters, envelope detectors, and integrators as described above with respect to FIG. 7 and FIG. 8. Each micromirror $910_A$, $910_B$ may deflect an optical beam between an input port and an output port. The controllers $914_A$, $914_B$ may be coupled to output drivers $916_A$, $916_B$ that drive the micromirrors $910_A$, $910_B$. In addition, each switch $902_A$, $902_B$ may include dither tone generators $918_A$, $918_B$ that produce dither tones characterized by two or more frequency components $f_{1A}$, $f_{2A}$, $f_{1B}$, $f_{2B}$ respectively as described above.

The frequency components $f_{1A}$, $f_{2A}$, $f_{1B}$, $f_{2B}$ of the dither tones produced by each dither tone generator $918_A$, $918_B$ may be chosen so that the upper frequency component $f_{2A}$ of the dither tone for a first switch $902_A$ does not interfere with the lower frequency component $f_{1B}$ of the dither tone for a second switch $902_B$. As used herein, two frequency components may be said to interfere (i.e., are not sufficiently different) if one component lies within the pass band for the band-pass filter that is used in the envelope detector to detect the other frequency component. By way of example, and without loss of generality, such interference may occur if two components are within about one Hz of each other.

As an example, the following formulas may be used to generate a set of dither tones $T_i = T_1, T_2 \ldots T_N$ of the type described above with respect to FIGS. 6A-6C that are configured to avoid interference in networks of cascaded switches. Each dither tone may be based on a base frequency. Each tone is characterized by two principal frequency components referred to as a lower component $f_{iL}$ and an upper frequency component $f_{iU}$. These components are typically the two frequency components of the Fourier spectrum of the dither tone having the greatest signal strength. It is noted that, depending on the nature of the dither tone, there may be more than two principal frequency components, in which case the following formulas may be modified to accommodate them.

The upper and lower frequency components $f_{iU}$, $f_{iL}$ for each dither tone $T_i$ may be computed from a base frequency $f_{oi}$ of the dither tone. Specifically, for the dither tone of FIGS. 6A-6C, the upper and lower frequency components may be approximated by:

$$f_{iU} = f_{oi} + \Delta f_i, \text{ and} \qquad \text{Eq. 1}$$

$$f_{iU} = f_{oi} - \Delta f_i, \text{ where} \qquad \text{Eq. 2}$$

$$\Delta f_i = \frac{f_{oi}}{2A+1}, \qquad \text{Eq. 3}$$

where A is a fitting parameter that may be determined from the Fourier spectrum of the dither tone $T_i$. In general, A will vary as the number of full cycles M of sinusoidal signal at frequency $f_{oi}$ and the odd number of half cycles at constant (e.g., zero) value in the dither tone $T_i$. By way of example, for the dither tone depicted in FIGS. 6A-6C with 5 full cycles of sinusoidal signal at frequency $f_o$ followed by one half cycle at zero, the value of A=5.

For an initial dither tone $T_i$, the base frequency may be chosen based on standard signal processing considerations. Specifically, the base frequency should be within a bandwidth of the control loop for the output drivers $916_A$, $916_B$ and below a Nyquist sampling rate for the optical signal monitors.

By way of numerical example, the base frequency $f_{o1}$ for the dither may be 100 Hz. Base frequencies $f_{o2}$, $f_{o3}$ ... $f_{oN}$ for successive dither tones $T_2$, $T_3$ ... $T_N$ may be calculated by adding multiples of a constant frequency increment $\delta f$ so that $$f_{oi} = f_{o1} + (i-1)\delta f, \text{ for } i > 1. \quad \text{Eq. 4}$$

Using the above-mentioned values of A and $f_{o1}$, an arbitrary value of $\delta f=3$ Hz and Eq. 1, Eq. 2, Eq. 3 and Eq. 4 a set of frequencies for successive dither tones may be generated as shown in TABLE I below.

TABLE I

| i | $f_{oi}$ | $\Delta f$ | $f_{iL}$ | $f_{iU}$ |
|---|---|---|---|---|
| 1 | 100.000 | 9.09 | 90.91 | 109.09 |
| 2 | 103.000 | 9.36 | 93.64 | 112.36 |
| 3 | 106.000 | 9.64 | 96.36 | 115.64 |
| 4 | 109.000 | 9.91 | 99.09 | 118.91 |
| 5 | 112.000 | 10.18 | 101.82 | 122.18 |
| 6 | 115.000 | 10.45 | 104.55 | 125.45 |
| 7 | 118.000 | 10.73 | 107.27 | 128.73 |
| 8 | 121.000 | 11.00 | 110.00 | 132.00 |

Note that in this example, $f_{8L}$ is within about 1 Hz of $f_{1U}$. Since this may lead to interference, a different formula may be used to calculate $f_{oi}$ for $i \geq 8$. For example, $$f_{oi} = \left(\frac{f_{o(i-2)} + f_{o(i-1)}}{2}\right)\left(\frac{2A+1}{2A}\right), \text{ for } i \geq 8 \quad \text{Eq. 5}$$

Using Eq. 4 for $1 \leq i < 8$ and Eq. 5 for $i \geq 8$, Table I may be modified to produce a set of dither tones having upper and lower frequencies that are sufficiently different from the upper and lower frequencies for any given dither tone avoid that interference between dither tones may be avoided. A resulting set of upper and lower frequencies for each dither tone is shown in TABLE II below.

TABLE II

| i | $f_{oi}$ | $\Delta f$ | $f_{iL}$ | $f_{iU}$ |
|---|---|---|---|---|
| 1 | 100.000 | 9.09 | 90.91 | 109.09 |
| 2 | 103.000 | 9.36 | 93.64 | 112.36 |
| 3 | 106.000 | 9.64 | 96.36 | 115.64 |
| 4 | 109.000 | 9.91 | 99.09 | 118.91 |
| 5 | 112.000 | 10.18 | 101.82 | 122.18 |
| 6 | 115.000 | 10.45 | 104.55 | 125.45 |
| 7 | 118.000 | 10.73 | 107.27 | 128.73 |
| 8 | 121.800 | 11.07 | 110.73 | 132.87 |
| 9 | 125.400 | 11.40 | 114.00 | 136.80 |
| 10 | 129.000 | 11.73 | 117.27 | 140.73 |
| 11 | 132.600 | 12.05 | 120.55 | 144.65 |
| 12 | 136.200 | 12.38 | 123.82 | 148.58 |
| 13 | 139.800 | 12.71 | 127.09 | 152.51 |
| 14 | 143.880 | 13.08 | 130.80 | 156.96 |
| 15 | 148.320 | 13.48 | 134.84 | 161.80 |
| 16 | 152.640 | 13.88 | 138.76 | 166.52 |
| 17 | 156.960 | 14.27 | 142.69 | 171.23 |
| 18 | 161.280 | 14.66 | 146.62 | 175.94 |
| 19 | 165.600 | 15.05 | 150.55 | 180.65 |
| 20 | 170.208 | 15.47 | 154.73 | 185.68 |
| 21 | 175.320 | 15.94 | 159.38 | 191.26 |
| 22 | 180.576 | 16.42 | 164.16 | 196.99 |
| 23 | 185.760 | 16.89 | 168.87 | 202.65 |
| 24 | 190.944 | 17.36 | 173.59 | 208.30 |
| 25 | 196.128 | 17.83 | 178.30 | 213.96 |
| 26 | 201.485 | 18.32 | 183.17 | 219.80 |
| 27 | 207.317 | 18.85 | 188.47 | 226.16 |

Note that in Table II, for all dither tones $T_i$ none of the upper frequencies $f_{iU}$ is within about 1 Hz of any of the lower frequencies $f_{iL}$ and vice versa.

Each of the switches 902A, 902B in the network 900 may select the dither tone for its dither tone generator 918A, 918B from a data stored in memory containing information similar to that shown in Table I and/or Table II and or program instructions that compute the upper and lower frequencies according to Eq. 1, Eq. 2, Eq. 3, Eq. 4 and Eq. 5 and stored values of A and $\delta f$. Different switches 902A, 902B on the network 900 may share dither tone information so that no two switches uses the same dither tone. It is noted that there may be a practical upper limit for the number of different dither tones. As a practical matter, the upper and lower frequencies should not exceed the Nyquist limit for the optical signal channel monitors 912A, 912B.

Figure 10A:
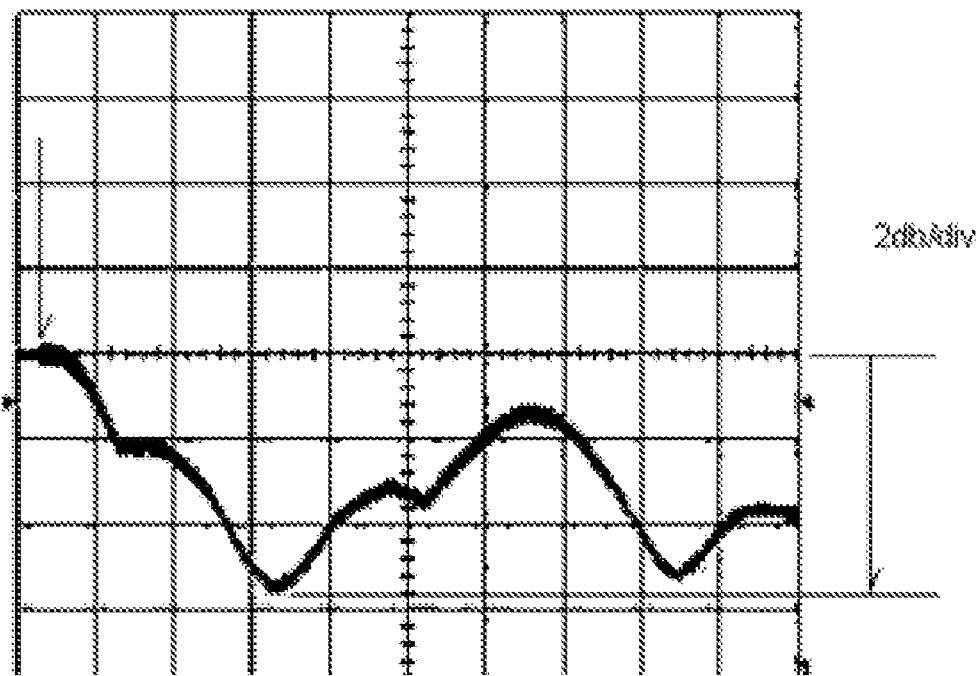
FIG. 10A depicts an oscilloscope trace of an optical signal in an optical switch under prior art servo control during application of an exogenous dither tone.

Embodiments of the present invention provide for dithering of servo-controlled micromirrors in a manner that is resistant to alien (exogenous) dither tones. Embodiments of the invention have been tested on a WavePath 4500 Wavelength Selective Optical Switch from Capella Photonics of San Jose, Calif. A servo control method of the type described with respect to FIG. 8 was tested in the closed loop system applied to a Port mirror of the WSS. A single channel output of the WSS was input to an optical detector for viewing on an oscilloscope. In a test of prior art, a simple sine/cosine dither tone of 100 Hz was applied to the input Port mirror two orthogonal axis and a disturbance of 0.6 dbm peak-to-peak was also applied as amplitude modulation on the input light source, simulating a network disturbance. FIG. 10A illustrates a captured oscilloscope trace of the optical detector when the alien tone is turned on while the servo was running during this test. As may be seen from FIG. 10A, the measured optical signal was observed to degrade by about 6 db from peak coupling in a time period of 3 seconds and fluctuate considerably thereafter.

Figure 10B:
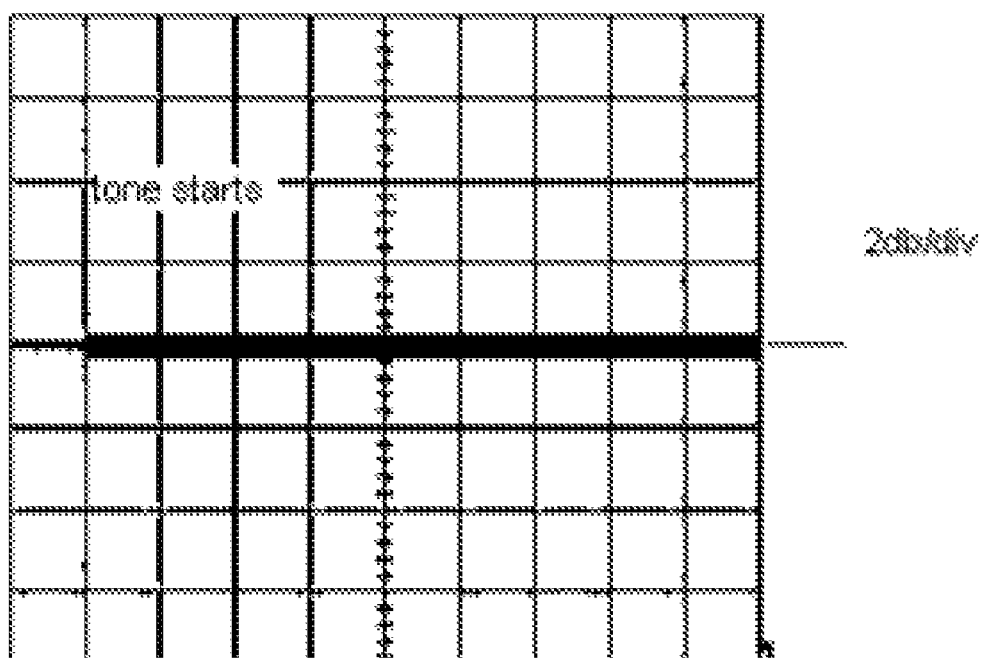
FIG. 10B depicts an oscilloscope trace of an optical signal in an optical switch under servo control according to an embodiment of the present invention during application of an exogenous dither tone.

In a second test of a method of the type described herein, a two-frequency-component dither tone of the type shown in FIGS. 6A-6C was applied to the port mirror and a disturbance of 0.6 dbm was also applied as amplitude modulation on the input light source and slowly swept manually over a frequency range of 40 Hz to 120 Hz. Servo control as described with respect to FIG. 7 and FIG. 8 was in affect in this example. FIG. 10B illustrates a captured oscilloscope trace of the optical detector when the alien tone is turned on while the servo was running during this test. In this case the Port servo was automatically disabled when the alien tone was detected and there was no appreciable degradation in optical coupling. As may be seen from FIG. 10B, there is no discernable change in optical coupling after the exogenous tone was turned on.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for dither control of a micromirror using a servo control loop in an optical switching apparatus, comprising:
   a) deflecting an optical beam from a first optical component of the optical switching apparatus to a second optical component with a micromirror;
   b) detecting an optical signal associated with a degree of coupling of the optical beam to the second optical component;
   c) applying a dither tone to an output driver that controls a position of the micromirror, wherein the dither tone includes two or more frequency components, including a first component and a second component;
   d) producing an output signal proportional to the optical signal;
   e) filtering the output signal in parallel with two or more band-pass filters including first and second band-pass filters to produce first and second band-pass outputs, wherein the first band-pass filter is characterized by a pass band centered on the frequency of the first component of the dither tone and the second band-pass filter is characterized by a pass band centered on the frequency of the second component of the dither tone;
   f) comparing the first and second band-pass outputs to each other and generating a comparison output, wherein the comparison output is equal to a sum of the first and second band-pass outputs if the first and second band-pass outputs are within a predetermined range of agreement, wherein the comparison output is equal to zero if the first and second band-pass outputs are not within the predetermined range of agreement;
   g) integrating the comparison output to produce one or more integrated signals; and
   h) driving the output driver using the one or more integrated signals.

2. The method of claim 1 wherein dither tone includes two or more cycles of a sinusoidal signal having a frequency $f_o$ followed by an odd number of half cycles for which the dither tone has a constant value.

3. The method of claim 1 wherein each component of the dither tone has a corresponding frequency that is greater than a DC bandwidth of the output driver and less than a sample rate for detecting the optical signal in b).

4. The method of claim 1 wherein the range of agreement is selected such that a ratio of the first band-pass output to the second band-pass output is approximately equal to a ratio of an amplitude of the first component of the dither tone to an amplitude of the second component of the dither tone.

5. The method of claim 1 wherein the output driver controls an angle of rotation of the micromirror with respect to an axis.

6. The method of claim 1 wherein c) includes applying the dither tone to a first output driver that controls an angle of rotation of the micromirror with respect to a first axis and applying a phase-shifted copy of the dither tone to a second output driver that controls an angle of rotation of the micromirror with respect to a second axis that is different from the first axis.

7. The method of claim 6 wherein g) includes splitting the comparison output into first and second parts, integrating the first part to produce a first integrated output and integrating the second part to produce a second integrated output, driving the first output driver using the first integrated output and driving the second output driver using the second integrated output.

8. The method of claim 7 wherein g) includes adding a first delay to the first integrated output and adding a second delay to the second integrated output, wherein the first delay is configured to align the first integrated output with the dither tone and the second delay is configured to align the second integrated output with the phase-shifted copy of the dither tone.

9. The method of claim 1 wherein f) includes computing an absolute value of the first band-pass output and applying a first low pass filter to the absolute value of the first band-pass output and computing an absolute value of the second band-pass output and applying a second low pass filter to the absolute value of the second band-pass output and comparing an output of the first low pass filter to an output of the second low pass filter.

10. An optical switching apparatus, comprising:
   a) first and second optical components;
   b) a micromirror configured to deflect an optical beam from the first optical component to the second optical component;
   c) an output driver operably coupled to the micromirror, wherein the output driver is configured to adjust a position of the micromirror in response to one or more control signals;
   d) an optical signal monitor configured to detect an optical signal associated with a degree of coupling of the optical beam to the second optical component and produce an output signal proportional to the optical signal;
   e) a dither tone generator configured to apply a dither tone control signal to the output driver, wherein the dither tone control signal includes two or more frequency components, including a first component and a second component;
   f) two or more band-pass filters configured to filtering the output signal in parallel, the two or more band-pass filters including first and second band-pass filters that respectively produce first and second band-pass outputs, wherein the first band-pass filter is characterized by a pass band centered on the frequency of the first component of the dither tone and the second band-pass filter is characterized by a pass band centered on the frequency of the second component of the dither tone;
   g) an envelope detector configured to compare the first and second band-pass outputs to each other and generate a comparison output, wherein the comparison output is equal to a sum of the first and second band-pass outputs if the first and second band-pass outputs are within a predetermined range of agreement, wherein the comparison output is equal to zero if the first and second band-pass outputs are not within the predetermined range of agreement;
   h) one or more integrators coupled to the envelope detector, wherein the one or more integrators are configured to integrate the comparison output to produce one or more integrated signals, wherein the one or more integrators are configured to couple the one or more integrated signals to a drive input of the output driver, whereby the one or more integrated signals drive the output driver.

11. The apparatus of claim 10 wherein dither tone includes two or more cycles of a sinusoidal signal having a frequency $f_o$ followed by an odd number of half cycles for which the dither tone has a constant value.

12. The apparatus of claim 10 wherein each component of the dither tone has a corresponding frequency that is greater than a DC bandwidth of the output driver and less than a sample rate for detecting the optical signal with the optical signal monitor.

13. The apparatus of claim 10 wherein the range of agreement is selected such that a ratio of the first band-pass output to the second band-pass output is approximately equal to a ratio an amplitude of the first component of the dither tone to an amplitude of the second component of the dither tone.

14. The apparatus of claim 10 wherein the output driver is configured to control an angle of rotation the micromirror with respect to an axis.

15. The apparatus of claim 10 wherein the output driver includes a first output driver configured to control an angle of rotation of the micromirror with respect to a first axis and a second output driver configured to control an angle of rotation the micromirror with respect to a second axis that is different from the first axis.

16. The apparatus of claim 15 wherein the dither tone generator is configured to apply the dither tone to the first output driver and apply a phase-shifted copy of the dither tone to the second output driver.

17. The apparatus of claim 16 wherein the envelope detector is configured to split the comparison output into first and second parts.

18. The apparatus of claim 17 wherein the one or more integrators include a first integrator configured to integrate the first part to produce a first integrated output, and a second integrator configured to integrate the second part to produce a second integrated output, wherein the first output is coupled to the first output driver and the second output is coupled to the second output driver.

19. The apparatus of claim 18 wherein the first integrator is configured to add a first delay to the first integrated output and wherein the second integrator is configured to add a second delay to the second integrated output, wherein the first delay is configured to align the first integrated output with the dither tone and the second delay is configured to align the second integrated output with the phase-shifted copy of the dither tone.

20. The apparatus of claim 10 wherein the envelope detector is configured to compute an absolute value of the first band-pass output and apply a first low pass filter to the absolute value of the first band-pass output and compute an absolute value of the second band-pass output and apply a second low pass filter to the absolute value of the second band-pass output and compare an output of the first low pass filter to an output of the second low pass filter.

21. The apparatus of claim 10 wherein the dither tone generator is configured to select the dither tone from among a plurality of dither tones each dither tone having a first component and a second component, wherein for each dither tone, the corresponding first component and/or second component is characterized by a frequency that that is sufficiently different from every other first and second component to avoid interference with every other dither tone in the plurality.

22. An apparatus for dither control of a micromirror using a servo control loop in an optical switching apparatus, comprising:
a) means for deflecting an optical beam from a first optical component of the optical switching apparatus to a second optical component with a micromirror;
b) detecting an optical signal associated with a degree of coupling of the optical beam to the second optical component;
c) means for applying a dither tone to an output driver that controls a position of the micromirror, wherein the dither tone includes two or more frequency components, including a first component and a second component;
d) means for producing an output signal proportional to the optical signal;
e) means for filtering the output signal in parallel with two or more band-pass filters including first and second band-pass filters to produce first and second band-pass outputs, wherein the first band-pass filter is characterized by a pass band centered on the frequency of the first component of the dither tone and the second band-pass filter is characterized by a pass band centered on the frequency of the second component of the dither tone;
f) means for comparing the first and second band-pass outputs to each other and generating a comparison output, wherein the comparison output is equal to a sum of the first and second band-pass outputs if the first and second band-pass outputs are within a predetermined range of agreement, wherein the comparison output is equal to zero if the first and second band-pass outputs are not within the predetermined range of agreement;
g) means for integrating the comparison output to produce one or more integrated signals; and
h) means for driving the output driver using the one or more integrated signals.

23. An optical network, comprising:
a plurality of optical switches optically connected to each other, wherein each optical switch includes:
a) an input port and an output port;
b) a micromirror configured to deflect an optical beam from the input port to the output port;
c) an output driver operably coupled to the micromirror, wherein the output driver is configured to adjust a position of the micromirror in response to one or more control signals;
d) an optical signal monitor configured to detect an optical signal associated with a degree of coupling of the optical beam to the output port and produce an output signal proportional to the optical signal;
e) a dither tone generator configured to apply a dither tone control signal to the output driver, wherein the dither tone control signal includes two or more frequency components, including a first component and a second component;
f) two or more band-pass filters configured to filtering the output signal in parallel, the two or more band-pass filters including first and second band-pass filters that respectively produce first and second band-pass outputs, wherein the first band-pass filter is characterized by a pass band centered on the frequency of the first component of the dither tone and the second band-pass filter is characterized by a pass band centered on the frequency of the second component of the dither tone;
g) an envelope detector configured to compare the first and second band-pass outputs to each other and generate a comparison output, wherein the comparison output is equal to a sum of the first and second band-pass outputs if the first and second band-pass outputs are within a predetermined range of agreement, wherein the comparison output is equal to zero if the first and second band-pass outputs are not within the predetermined range of agreement;
h) one or more integrators coupled to the envelope detector, wherein the one or more integrators are configured to integrate the comparison output to produce one or more integrated signals, wherein the one or more integrators are configured to couple the one or more integrated signals to a drive input of the output driver, whereby the one or more integrated signals drive the output driver.

24. The network of claim 23 wherein the dither tone for one or more optical switches in the network includes two or more cycles of a sinusoidal signal having a frequency $f_o$ followed by an odd number of half cycles for which the dither tone has a constant value.

25. The network of claim 23 wherein the dither tone generator for each optical switch in the network is configured to select the dither tone from among a plurality of dither tones each dither tone having a first component and a second component, wherein for each dither tone, the corresponding first component and/or second component is characterized by a frequency that that is sufficiently different from every other first and second component to avoid interference with every other dither tone in the plurality.

* * * * *